US005889474A

United States Patent [19]

LaDue

[11] Patent Number: 5,889,474

[45] Date of Patent: *Mar. 30, 1999

[54] METHOD AND APPARATUS FOR TRANSMITTING SUBJECT STATUS INFORMATION OVER A WIRELESS COMMUNICATIONS NETWORK

[75] Inventor: Christoph K. LaDue, Santa Cruz, Calif.

[73] Assignee: Aeris Communications, Inc., San Jose, Calif.

[ * ] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,594,740.

[21] Appl. No.: 543,983

[22] Filed: Oct. 17, 1995

Related U.S. Application Data

[63] Continuation-in-part of Ser. No. 539,975, Oct. 6, 1995, abandoned, Ser. No. 524,972, Sep. 8, 1995, Pat. No. 5,525, 969, Ser. No. 488,839, Jun. 9, 1995, and Ser. No. 250,665, May 27, 1994, abandoned, said Ser. No. 524,972, is a continuation-in-part of Ser. No. 416,483, Apr. 4, 1995, which is a continuation-in-part of Ser. No. 55,806, Apr. 30, 1993, abandoned, which is a continuation-in-part of Ser. No. 884,902, May 18, 1992, abandoned, said Ser. No. 488,839, said Ser. No. 250,665, each , Continuation-in-part of Ser. No. 112,476, Aug. 27, 1994, abandoned.

[51] Int. Cl.$^{6}$ .................................................. G06F 7/00

[52] U.S. Cl. .............................. 340/825.49; 340/825.54; 340/573; 379/37; 379/38

[58] Field of Search ......................... 340/825.44, 825.54, 340/825.34, 505, 539, 573, 572, 825.49; 455/9, 11.1, 12.1, 13.2, 33.1; 379/38, 58–60, 42, 49, 57, 8

[56] References Cited

U.S. PATENT DOCUMENTS 3,937,892 2/1976 Bloch et al. ........................ 179/15 AL
4,633,464 12/1986 Anderson ................................ 370/111
4,675,656 6/1987 Narcisse .................................. 340/539
4,713,808 12/1987 Gaskill et al. ............................ 370/94

(List continued on next page.)

OTHER PUBLICATIONS

Jarnecki, J. et al., Microcell Design Principals; all, ICEE Comm. Apr. 1993.

Forcarile, et al. Cellular Pager, 1–9 pp.: Statutory Ins. Reg. H 601 Mar. 7, 1989.

Roach, et al. "Methods and Apparatus For Communicating via A Cellular Network Control Channel", all; PCT International Application, WO 95/24791, 14 Sep. 1995.

*Primary Examiner*—William A. Cuchlinski, Jr.
*Assistant Examiner*—Yonel Beaulieu
*Attorney, Agent, or Firm*—Blakely Sokoloff Taylor & Zafman, LLP

[57] ABSTRACT

A method and apparatus of transmitting subject status information, such as the status and location of a parolee or individual under house arrest, to a central monitoring station (CMS) operated by, for example, a parole staff or correctional facility. The subject status information is transmitted by a band or collar attached to, for example, the leg or wrist of the subject. A cellular radio communicator receives, encodes and transmits the subject status information over the control channel of a cellular radio communications network as control signals, bypassing the voice channels, to a mobile switching center (MSC) of the cellular radio communications network. The MSC decodes and forwards the subject status information over the public switched telephone network (PSTN) to the CMS. Optionally, the CMS may send a command to the communicator over the same data paths, i.e., the PSTN to the MSC, then over the control channel, formatted as a control signal, to the cellular radio communications network communicator. The communicator may integrate a paging receiver, or a satellite receiver, or other wireless receiver for receiving commands out of band, i.e., by way of communication networks other than the cellular radio communications network. The method and apparatus may also be utilized to track to position of more than one subject relative to other subjects or objects.

30 Claims, 11 Drawing Sheets

U.S. PATENT DOCUMENTS

| | | | |
|---|---|---|---|
| 4,750,197 | 6/1988 | Denekamp | 379/58 |
| 4,809,316 | 2/1989 | Namekawa | 379/58 |
| 4,821,309 | 4/1989 | Namekawa | 379/58 |
| 4,825,457 | 4/1989 | Lebowitz | 379/40 |
| 4,831,373 | 5/1989 | Hess | 340/825.03 |
| 4,905,271 | 2/1990 | Namekawa | 379/58 |
| 4,924,211 | 5/1990 | Davies | 340/573 |
| 5,005,014 | 4/1991 | Jasinski | 340/825.44 |
| 5,023,901 | 6/1991 | Sloan et al. | 379/38 |
| 5,027,383 | 6/1991 | Sheffer | 379/39 |
| 5,030,940 | 7/1991 | Siikarla | 340/572 |
| 5,048,015 | 9/1991 | Zilberfarb | 370/110.4 |
| 5,055,851 | 10/1991 | Sheffer | 342/457 |
| 5,077,830 | 12/1991 | Mallia | 455/58 |
| 5,093,927 | 3/1992 | Shanley | 455/34 |
| 5,170,426 | 12/1992 | D'Alessio et al. | 379/38 |
| 5,235,633 | 8/1993 | Dennison et al. | 379/60 |
| 5,239,294 | 8/1993 | Flanders et al. | 340/825.34 |
| 5,239,680 | 8/1993 | Grube et al. | 455/38.1 |
| 5,255,306 | 10/1993 | Melton et al. | 379/38 |
| 5,337,345 | 8/1994 | Cassidy et al. | 379/58 |
| 5,355,511 | 10/1994 | Hatano et al. | 455/11.1 |
| 5,357,254 | 10/1994 | Kah, Jr. | 342/42 |
| 5,410,737 | 4/1995 | Jones | 455/56.1 |
| 5,420,911 | 5/1995 | Dahlin et al. | 379/59 |
| 5,422,626 | 6/1995 | Fish | 340/539 |
| 5,432,495 | 7/1995 | Tompkins | 340/429 |
| 5,432,841 | 7/1995 | Rimer | 379/59 |
| 5,448,760 | 9/1995 | Frederick | 455/56.1 |
| 5,448,773 | 9/1995 | McBurney et al. | 455/343 |
| 5,465,387 | 11/1995 | Mukherjee | 455/261 |
| 5,483,465 | 1/1996 | Grube et al. | 364/546 |
| 5,525,967 | 6/1996 | Azizi et al. | 340/573 |
| 5,525,969 | 6/1996 | LaDue | 340/573 |
| 5,526,401 | 6/1996 | Roach, Jr. et al. | 379/59 |
| 5,537,102 | 7/1996 | Pinnow | 340/825.3 |
| 5,568,119 | 10/1996 | Schipper et al. | 340/825.37 |
| 5,594,740 | 1/1997 | LaDue | 379/59 |

46 STATUS BITS
10 PARITY BITS
ONE CODED BIT
X4
184 BITS
PARITY 40 BITS
4c
X4
456 CODED BITS
103
107
134
135
128
136
SDCCH 5
SDCCH 6
SDCCH 7
CCADCH 0
CCADCH 1
CCADCH 2
CCADCH 3
CCADCH 4
CCADCH 5
CCADCH 6
CCADCH 7
SDCCH 0
SDCCH 1
SDCCH 2
SDCCH 3
SDCCH 4
51 FRAMES = 235.38ms
UPLINK SDCCH/8 + CCADCH/8, I = IDLE FRAMES.
ECS/GSM LOG CH COMB.
137
129
130
131
132
125
126
127
138
139
140
141
142
143
00=R

METHOD AND APPARATUS FOR TRANSMITTING SUBJECT STATUS INFORMATION OVER A WIRELESS COMMUNICATIONS NETWORK

The present application is a continuation-in-part of application Ser. No. 08/539,975, filed Oct. 6, 1995, abandoned; a continuation-in-part of application Ser. No. 08/524,972, filed Sep. 8, 1995, issued as U.S. Pat. No. 5,525,969, which is a continuation in part of application Ser. No. 08/416,483, filed Apr. 4, 1995, which is a continuation of application Ser. No. 08/055,806, filed Apr. 30, 1993, abandoned which is a continuation in part of application Ser. No. 07/884,902, filed May 18, 1992, abandoned; a continuation-in-part of copending application Ser. No. 08/488,839, filed Jun. 9, 1995, which is a continuation-in-part of application Ser. No. 08/112,476, filed Aug. 27, 1993, abandoned; and a continuation-in-part of application Ser. No. 08/250,665, filed May 27, 1994, abandoned, which is a continuation-in-part of application Ser. No. 08/112,476, filed Aug. 27, 1993; all of which are assigned to the assignee of the present application.

BACKGROUND OF THE INVENTION

1. Field of the Invention

The present invention relates to communications protocols and communications systems related to Global System for Mobile (GSM) cellular Personal Communications Systems (PCS) radio networks. In addition, the present invention relates to the application of GSM communications control channel protocols, and network protocols for Continuous Custodial Electronic Monitoring (CCEM) applications for home arrest systems, keep a-way systems, child protection systems, personal protection-911 systems, and medical alert systems. These applications utilize Global Positioning System (GPS), Loran C, Dead Reckoning, and other location correlating telemetry tracking systems, for location monitoring and whereabouts verification.

2. Description of Related Art

A variety of operations standards, methods and apparatuses have been proposed in recent years for enabling a more efficient means of providing continuous custodial electronic monitoring (CCEM). Most of these systems are antiquated, insecure, and inadequate in terms of technical and logistical operations. Most home arrest systems are stationary and depend upon landline telephone network infrastructure. Circuit switched voice channel cellular have been proposed and tested, but are expensive and not secure. The present invention utilizes Global System for Mobile (GSM) a high tier, low density version of proposed Personal Communications Systems (PCS). The GSM originally utilized in Europe is the system that all PCS systems are derived from, in the U.S., Europe and Asia. These PCS cellular systems include two way digital voice services, two way paging, two way point-to-point short messaging, point to omnipotent broadcast information messages, voice mail, single number services, electronic mail, internet access and other related services. Other services proposed include motor vehicle fleet management, motor vehicle anti-theft, and other topographical coordinance systems that provide location data bearer service processing centers, also known as central monitoring stations. But all of these services operate on digital traffic channels and short messaging channels that utilize significant portions of system capacity, do not offer a high degree of operations flexibility, and are to costly to the custodial facilitator, and end user in terms of service and equipment cost. Heretofore, it has not been proposed to utilize digital access and cellular digital control channels as a means and methodology to transmit and manage data packets that contain information that reveal home arrest subject behavioral status, identification, and current location information to CCEM program custodial staff. Other systems such as wireless Cellular Data Packet Data (CDPD) operate on existing analog and digital cellular networks. But, CDPD is expensive to apply to a cellular network. CDPD has an overly complicated protocol, and end user equipment is expensive. Also, CDPD is not designed to handle short messaging very well, the system is specifically designed for the purpose of transmitting and receiving large data files from computer to computer. Additionally, heretofore no method or apparatus provides a truly efficient, versatile, practical and secure wireless radio based continuous custodial electronic monitoring (CCEM). The present invention also can utilize such cordless telephone standards as CT2, CT2+, digital and European Cordless Telephone (DECT) standards that are low tier high density extensions of the GSM standard.

There is a clear need for an efficient, accurate, robust and low cost means and method for providing two way data packet messaging that support continuous custodial electronic monitoring (CCEM) services that will operate within all cellular mobile radio systems, and personal communications systems (PCS) control and access channels. The present invention utilizes its own logical data configuration called the Continuous Custodial Application Data Channel (CCADCH) This two way data packet messaging system is designed to provide a viable platform for implementing a wide spectrum of continuous custodial electronic monitoring (CCEM) bearer services for existing cellular mobile radio, personal communications systems (PCS) and Global System for Mobile (GSM) in use throughout the world. More importantly, there is a desperate social and economic need to provide efficient, cost effective and secure continuous custodial electronic monitoring (CCEM) systems. Present home arrest technology is antiquated, expensive, and unreliable. The present invention provides a comprehensive and complete wireless radio solution to the desperate needs of the corrections industry. Prison systems today are overcrowded and dangerous. Many non-violent offenders do not need to be incarcerated, and should be placed in the community to maintain a job, and contribute to society instead of draining our diminishing tax base. Housing convicted criminals cost the tax payer anywhere from $20,000 to $30,000 per inmate a year. Building new prisons drain state and federal resources. Home arrest program costs are paid by the offender. In this way offenders contribute to society, shoulder the cost of the program. In addition, the home arrest subject is required to maintain employment and pay his fair share of taxes, and pay restitution to property crime victims. The present invention is designed to monitor the non violent offender which takes up to 60% of prison bed space in today's corrections world.

Another problem with present home arrest systems is that they are extremely limited in many functions. Typically most home arrest subjects are required to adhere to a rigid schedule of behavior such as designated curfews, call in times, drug and alcohol testing and periodic verification of whereabouts by program officials. For example, a home arrest program participant will be required to report to his place of residence after his work hours. Usually the home arrest subject is allowed to go to a grocery store and complete other errands after work hours, but then must be home at specific time. Once he arrives at home, the stationary communicator detect the carrier wave of his leg transmitter and sends verification data over the land line telephone network to a central monitoring station. As long as the communicator detects the carrier wave of the leg transmitter, no violation reporting is needed. If however, the home arrest subject moves far away enough from the communicator, its radio receiver no longer detect the carrier wave of the leg transmitter. The communicator shifts into violation status, and sends violation data over the land line telephone network to the central monitoring station, and central monitoring staff report the violation to the appropriate custodial agency. Another problem with current home arrest technology is that after the subject leaves his residence, there is no effective way to detect his whereabouts, and behavior. Present procedures require a parole officer to drive by the participant's place of employment, stick a radio receiver out the window of his car, or exit his car and try to detect the carrier wave of the participant's leg band. This approach often does not work because of the propagation characteristics of radio waves inside of buildings, interference from work related systems and other signal power factors. Also, the parole officer's time could be used more effectively elsewhere. In today's corrections environment, parole officers and other custodial personnel are so over worked with parolee and probationer case loads, that the very idea of spending time driving by participants places in order to verify location of subject at place of employment is almost ludicrous. The present invention provides an elegant, cost effective, efficient and technically secure operational solution to the needs of the corrections industry and society as a whole.

Additionally, the present invention provides the means and methodology of creating an additional function to GSM cellular system access procedures that will be as simple and efficient as all other cellular access procedures. The present invention provides a precise and controlled application data packet methodology that logically creates a separate but compatible continuous control application (CCADCH) data protocol to existing cellular access protocols, whereby creating an elegant application data routine that becomes a normal and routine part of cellular system data management, system access, and mobile communications terminal management, while at the same time adding a much needed higher margin of safety and security for monitoring the behavior and whereabouts of sociopaths.

SUMMARY OF THE INVENTION

Accordingly, it is an object of the present invention to provide the means and methodology for utilizing cellular data communications protocols, and data communications apparatuses designed to provide continuous custodial electronic monitoring (CCEM) systems and services that are applicable to existing cellular mobile radio networks also known as personal communications systems (PCS) and Global System for Mobile (GSM) networks. It is another object of the present invention to provide specialized data protocols that will operate seamlessly without having to significantly modify existing network GSM cellular air-interface and network infrastructure. Furthermore, the present invention will dramatically reduce the direct cost of implementing a wide spectrum of continuous control application data (CCADCH) services that up until now forced wireless network operators to spend millions of dollars to implement inefficient and costly data packet systems, for computer file transfers and other such consumer related applications. The present invention provides for a pristine and elegantly simple solution for providing security related custodial services that include but are not limited to synchronized, asynchronous, packet switched, packet assembler/dissembler access protocols that make possible; two way custodial data messaging, two way custodial paging, home arrest subject management; including child protection, battered spouse protection, medical alert, personal protection 911 and other related program methodologies. The present invention utilizes Global Positioning System (GPS) data communications, dead reckoning, Loran C data communications, and location based data delivery systems. It is another object of the invention to provide new data protocols that seamlessly fit within the highly efficient, robust and high speed existing access and physical and logical control channel protocols without causing disruption to existing GSM and other PCS cellular wireless network voice traffic, data traffic operations, and normal control channel routines. Furthermore, the present invention does not significantly impact any host cellular system capacity. In fact the present invention in no way causes any switching capacity problems, it is essentially a stand-alone virtual continuous control application data communications network that does not need to utilize any part of the cellular switch. However, the present invention can be adapted and fully integrated with all GSM cellular base transceiver stations (BTS), base site controllers (BSC) and mobile switching center (MSC) switching, and processing schemes, without added infrastructure hardware. This is accomplished by upgrading simple switch operations software patches that allow for recognition, processing and routing of continuous control application data channel (CCADCH) data packets. These software patches maximize system efficiency while at the time minimizing any impact upon overall cellular system capacity. The present invention adds application specific data words by two ways; one by tagging onto cellular system, and signaling protocols contained within multiword data packets that transport user information contained within registration protocols, origination protocols, equipment registration protocols, home location register (HLR) access protocols, visitor location register (VLR) access protocols, and other system management and signaling protocols. Secondly, the present invention creates a distinct logical channel that is transportable over existing digital physical access channels used by all digital cellular standards in the world today. These physical and logical channel protocols are transmitted from CCADCH communications terminals to GSM cellular system base transceiver stations (BTS), mobile switching centers (MSC) and subsequently relayed and routed to the public switch telephone networks (PSTN) and public land mobile networks (PLMN). These data words are created and transmitted by the present inventions core application specific communicators and terminals for the purpose of sending global positioning system (GPS) correlative reference data bits, dead reckoning, and Loran C data and other terminal, monitored person and or application specific device status bits to master central monitoring stations (MCMS), that process and relay said data words to individual continuous custodial electronic monitoring (CCEM) correctional service bearers and service facilitators. These bearers are police departments, parole agencies, probation agencies, behavioral research facilitates, and private corrections companies that monitor and track the movement and behavior of convicted persons serving sentences that require to be controlled by various continuous custodial electronic monitoring methods. These methods include but are not limited to drug and alcohol testing, aggression level management, movement tracking, location establishment, behavioral modification, custodial program violation apprehension, medical alert monitoring, personal protection 911, and other such CCEM program procedures.

The means and methodology disclosed herein also provides for full integration of CCEM components that are separate data gathering systems such as a global positioning system receivers, dead reckoning receivers, Loran C receivers, radio receivers that detect carrier waves from custodial leg and wrist band transmitters, and underskin biometric transponding implant sensors that are integrated to normal but modified cellular terminals or communicators. The present invention's CCEM communications terminals are specially designed to process, and send the status bits created by these separate but physically integrated devices within physical and logical control channel, signaling channel and system access channel multi-word packet protocols that are utilized by various cellular radio analog and digital uplink and down link modulation schemes. The disclosed methodology offers unique interface protocols that are programmed to provide a transparent integration of these device status bits with physical and logical control channel and access channel bit fields that are normally used by analog and digital cellular terminals for host cellular system access, registration, origination, frequency assignment and other related physical and logical control channel and access channel processes. In fact, the present invention's application specific status bit fields are sent simultaneously with standard physical and logical control channel and access channel information bits, and are virtually transparent to the host cellular system. Furthermore, the present invention provides for a separate and unique continuous control application data channel (CCADCH) protocols that in fact create additional and distinct logical protocols for all known digital cellular physical access channels utilized in the world today. The present invention's CCADCH status bits contains additional information, such as home arrest subject; position, velocity, direction, activity status, violation status bits, drug blood level detection status bits, alcohol blood, alcohol breath level, adrenaline blood level status, various hormonal levels, and brain wave activity status bits, and many other related CCEM specific status bits.

Accordingly, it is a further object of the present invention, to provide the means and method of reading, and processing these special application specific data words at the cellular system base transceiver station (BTS), base site controller (BSC) and mobile switching center (MSC) without further taxing host cellular air interface system and switch resource capacity. These special application specific data words are received, scanned, recognized, recorded at the base transceiver station (BTS), base site controller (BSC) and mobile switching center (MSC), and then routed to central monitoring, and to correctional facilitator and service bearer service centers for direct interaction with the home arrest participant via the PSTN , PLMN, paging , satellite and other various networks.

Furthermore, the present invention provides for full duplex communications by integrating paging receivers, cell broadcast receivers, forward control channel receivers, forward base channel receivers, digital traffic channel receivers, and satellite receivers to the above mentioned CCADCH communications terminal. Special instructional or command messages are sent from the Master Central Monitoring Station (MCMS) by electronic and man-machine interface terminals via the PSTN/PLMN network to designated paging network controllers, cellular network switching centers and satellite network controllers. Once received, these command messages are processed and subsequently transmitted to one or many continuous custodial application data channel (CCADCH) communications terminals via normal paging, cellular, and cell broadcast base stations and other radio transmission systems. Once the CCADCH communications terminal receives the special command or instructional message, it is programmed to respond by processing and recognizing the significance of a particular command message and transmits the response over physical and logical control channels, signaling and access channels in the heretofore mentioned manner.

Another important feature of the present invention is its ability to provide accurate message accounting, in that each CCADCH data packet is considered an individual transaction, therefore the correctional bearer facilitator is charged for only the CCADCH data packet sent, not for a predetermined of blanket cellular charge per minute charge.

To achieve the foregoing object, and in accordance with the purposes of the invention as embodied and broadly described herein, specialized communications protocols and communications apparatuses are provided for application specific data communications for use with cellular mobile radio networks, personal communication systems (PCS) network, global system for mobile (GSM) and satellite system networks, that integrate and operate within existing physical and logical control channel, signaling channel, digital traffic channel, primary digital access channel, sub digital control channel, secondary digital access channel, fast associated control channel, authentication channels, slow associated control channel, and all other control channel protocols that utilize analog FSK, digital TDMA, digital CDMA, and other wireless analog and digital network platforms that are specified in official documents generically designated broadly as Interim Standards (IS) published by the Telephone Industry Association (TIA), and (ETS) standards by the European Telephone Standard (ETS).

Additional objects and advantages of the invention will be set forth in part in the description which follows, and in part will be obvious from the description, or may be learned by practice of the invention. The object and advantages of the invention may be realized and attained by means of the elements and combinations particularly pointed out in the appended claims.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiments given below, serve to explain the principles of the invention.

Figure 1A:
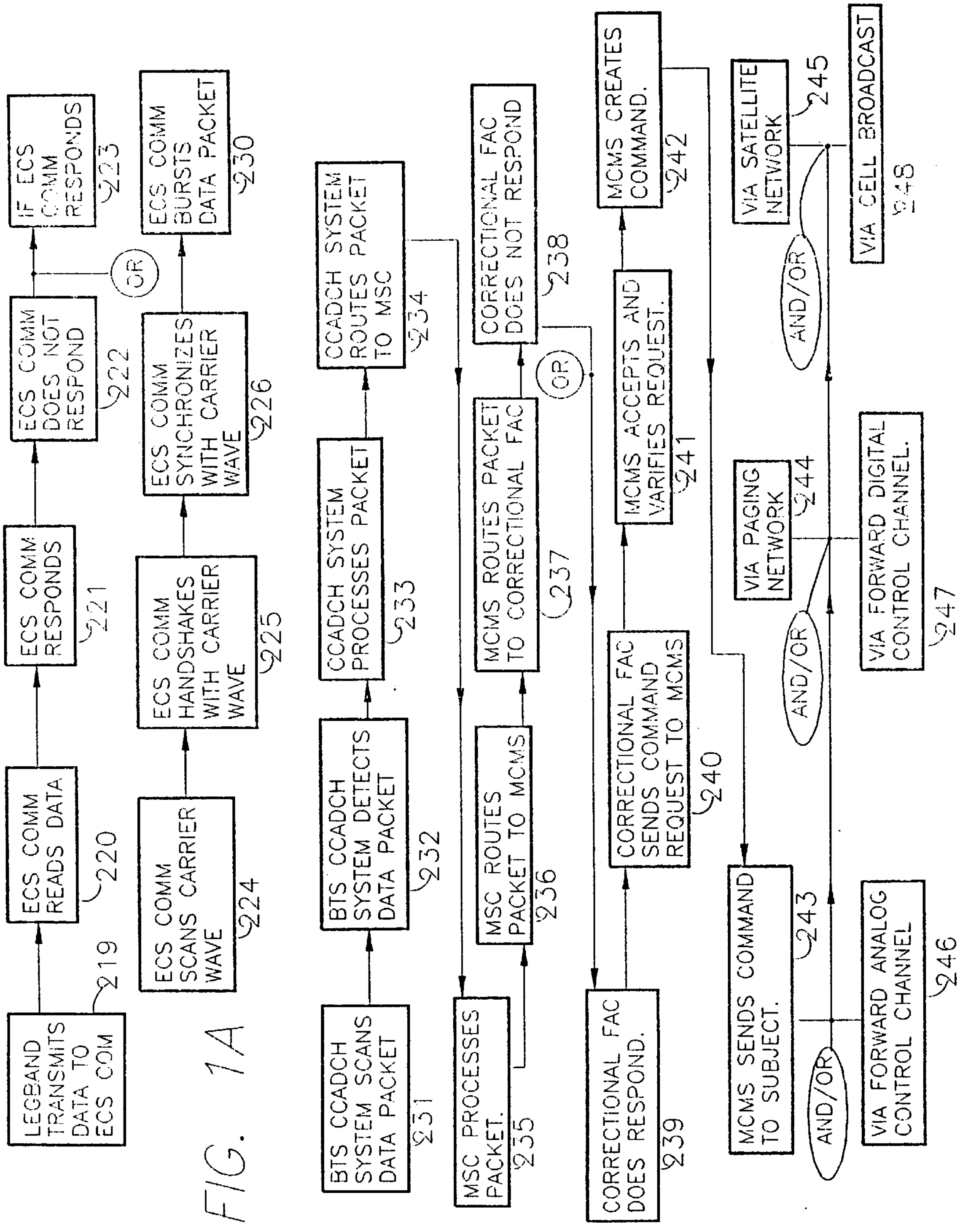
FIG. 1A is a block diagram illustrating the basic CCADCH system protocol, according to the present invention.

DETAILED DESCRIPTION OF THE PREFERRED EMBODIMENTS OF THE INVENTION.

Reference will now be made in detail to the present preferred embodiments of the invention as illustrated in the accompanying drawings. In describing the preferred embodiments and applications of the present invention, specific terminology is employed for the sake of clarity. However, the invention is not intended to be limited to the specific terminology so selected, and it is understood that each specific element includes all technical equivalents which operate in a similar manner to accomplish a similar purpose.

Accordingly, a global system from mobile electronic capture is provided for transmitting and monitoring home arrest subject status data over cellular radio system control channels, comprising: detecting data related to a home arrest subject identification and positional status and manipulating the data related to said home arrest subject identification and positional status; transmitting the data related to a home arrest subject identification and positional status utilizing a global system for mobile digital TDMA 51 multi-frame 184 format that operate within logical and physical channel protocols; and applying the data related to a home arrest subject identification and positional status to identify, monitor, and locate the home arrest subject.

In accordance with the present invention there is also provided a mobile communications apparatus for collecting, processing, and transmitting home arrest subject status data over global system for mobile 184 bit word 51 multi-frame control channels, comprising: first means for receiving identification band transmitter status information; second means for receiving and calculating relative location information; the first means for receiving identification band transmitter status information being communicatively linked to the second means for receiving and calculating relative location information. Third means for receiving command and instruction messages from a paging network; the first means for receiving identification band transmitter status information and the second means for receiving and calculating relative location information being communicativley linked to the third means for receiving command and instruction messages from a paging network; forth means for receiving command and instruction messages from a global system for mobile BCCH broadcast control channel; and fifth means for detecting and receiving shortened identification data radio message bursts from a home arrest subject's communicator; the forth means for receiving command and instruction messages being communicatively linked to said firth means for receiving shortened identification data radio message bursts from the home arrest subject's communicator.

A portable communicator for home arrest subject monitoring is also provided, comprising: a first cellular global system for mobile 8 slot TDMA transceiver for transmitting control channel and voice channel traffic signals from a cellular network; a second cellular global system for mobile 8 slot TDMA transceiver configured to transmit continuous custodial application data modified 51 multi-frame CCADCH logical channel 184 bit word blocks which include home arrest application specific status data information. The first cellular global system for mobile transceiver being communicativley linked to the second cellular global system for mobile transceiver. Central processing unit means for controlling and operating an applications specific device and for transmitting application specific control channel 51 multi-frame TDMA CCADCH logical channel 184 word blocks to a cellular network including the home arrest subject status information are provided. Radio receiver means for receiving radio waves that contain data related to said home arrest subject and global positioning means for correlating GPS data from the home arrest communicator and transmitting the data to the central processing unit means are operably linked thereto and described in greater detail as follows.

Referring to FIG. 1A, Leg band transmits status data 219 to ECS communicator leg band receiver that is an integrated part of the ECS communicator system. The ECS communicator reads the leg band data 220. This data represents a preset parameter of leg band operations variables. These data variables include but are not limited to; tamper detect, battery level detect, biometric implant blood substance level measurements, and timed release of status data radio transmissions to the ECS communicator. The ECS communicator responds 221, or does not respond 222, to received leg transmitter data. This function signifies whether ECS communicator program reads violation data or not. The ECS communicator preferably does not communicate to the CCADCH virtual network if there is no requirement to communicate of leg band operations status. If the ECS communicator needs to respond 223 to leg band status data, or transmit correlated GPS location data contained within the communicator GPS receiver, it then creates a record, scans the cellular carrier's forward analog control channel or forward digital control channel carrier radio wave 224, handshakes with forward channel carrier wave 225, digital or analog, and then synchronizes with the analog or digital air interface protocol 226. Once synchronization is complete, the ECS communicator bursts its analog or digital data packet 230. Then the Continuous Control Application Data Channel (CCADCH) base site transceiver (BTS) system scans all data packets 231, and subsequently detects the data packet 232. Once detected, the CCADCH base transceiver site system processes the packet 233, by converting it to a public switched telephone network protocol, preferably T1/E1 and routes the packet to the mobile switching center (MSC) 234. The MSC processes the packet by counting each packet 235, and then routes the packet via the PSTN to the master central monitoring station (MCMS) 236. Once the packet is processed, the MCMS routes the data packet to the government or private correctional facility 237. The correctional facility evaluates the status of the bits contained within the packet, and chooses not to respond 238, or to respond 239, by sending a command request to the MCMS 240. The MCMS receives, accepts and verifies the command request 241. The MCMS subsequently creates the command data packet 242, and subsequently sends command data packet to continuous custodial electronic monitoring CCEM subject 243 via paging network 244, and/or via satellite network 245, and/or via forward analog control channel FOCC 246, and/or via forward digital control channel FDCCH 247, and or via cell site broad cast channel BCCH 248. This aforementioned protocol methodology operates in this manner with all cellular air interface and network standards. Additional component parts and operational procedures of the Electronic Capture System are depicted in FIG. 1B, the explanation is as follows.

Figure 1B:
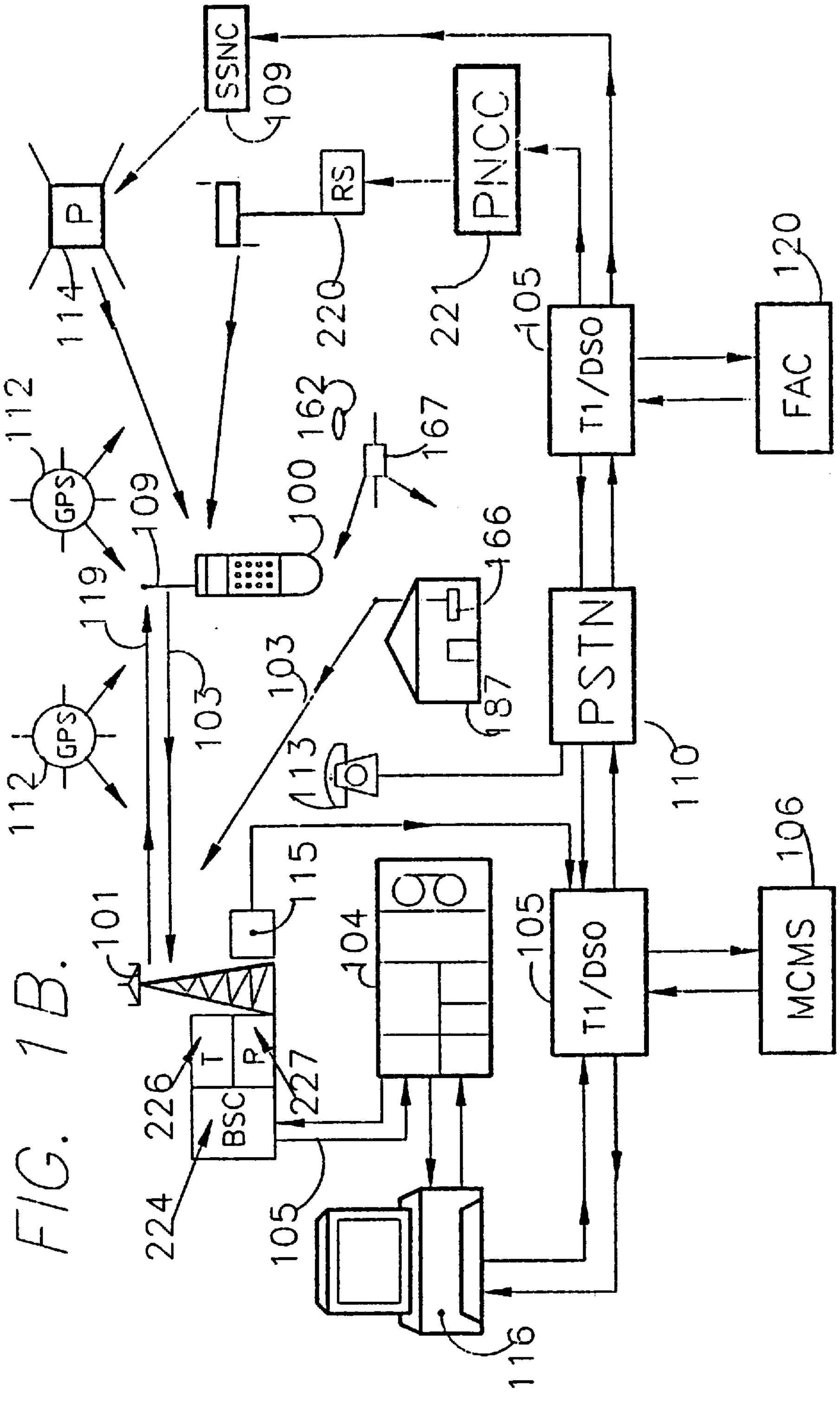
FIG. 1B is a block diagram of a preferred electronic capture system (ECS) control channel application data communications system, and apparatus, according to the invention.

Referring to FIG. 1B, a Continuous Control Application Data Channel (CCADCH) Electronic Capture System (ECS) preferably comprises an ECS mobile communications terminal 100, a stationary communications terminal 166, an identification band such as a leg/wrist band 167, with biometric sensor implant transponder 162, a plurality of base transceiver sites (BTS) 101, and base site controllers (BSC) 224. A plurality of mobile switching centers (MSC) 104 is shown with CCADCH data word packet processor 115, which is preferably located at each base transceiver site (BTS) 101, and at each mobile switching center (MSC) 104. A public switched telephone network (PSTN) 110 with T1 carrier 105 and a landline telephone 113 for custodial agent access is linked to a master central monitoring station (MCMS) 106 regional processing center, a plurality of correctional facilitator bearer service providers (FAC) 120, a plurality of global positioning Navstar satellites (GPS) 112, and Inmarsat P satellites 114. Cell broadcast transmitters 226 and specialized control and access channel receivers 227 are preferably communicatively linked with, paging network controllers (PNCC) 221, and satellite system network controllers 109.

Preferably each base transceiver site (BTS) 101, and base site controller (BSC) 224 is physically positioned, and electronically integrated with one another Alternatively, base transceiver sites (BTS) 101, may operate as a separate system that is physically apart from the BSC 224. Both systems are integral parts of cellular mobile radio networks, and utilized by the methodology of the present invention, regardless what standard and cellular operations platform the present invention is adapted to. The ECS system may be configured with the following cellular operations standards; AMPS cellular, TACS cellular, ETACS cellular, NMT cellular, TDMA cellular, CDMA cellular, and/or a Global System for Mobile (GSM) cellular network systems. The present invention operates in essentially the same protocol and network methodology regardless of the type of air interface protocols and modulation formats a particular cellular systems control channels, access channels and overhead signaling channels are configured for, be it digital or analog. Furthermore, the base transceiver sites (BTS), base site controller (BSC), mobile switching centers (MSC), the PSTN and T1/E1 spans are, preferably, part of an existing cellular communications system which operates over a designated cellular communications band.

The MCMS 106, and FAC 120 are CCADCH virtual network system installations, comprising for example, of one or more computer terminals for processing data word packets, sending command instructions to the correctional facilitator 120, and monitored subject, and for maintaining system performance and account records. The MCMS and FAC also contain standard telephone lines, GPS, Loran C, dead reckoning and other topography tracking software, and readout displays, multiplexing switches, PSTN lines, T1/E1 lines, and other standard central monitoring and service center equipment, widely known, and descriptions are therefore omitted. As will be explained in more detail below the, BTS, BSC, MCMS and FAC process all receive CCADCH data word packets and configure all command and instruction data words to be transmitted to the end-user, by operating unique software programs contained within the processors and terminals located at these CCADCH system installations.

Each CCADCH multi-word GSM TDMA packet 103, that is transmitted from an ECS communicator 100, preferably contains location GPS bits, leg band transmitter status bit, alcohol, drug and other biometric status bits, and other home arrest subject status data information, used for Electronic Capture System (ECS) subject monitoring and control. This particular packet is designed to operate within the operation parameters of Global System for Mobile (GSM) control channel and network protocol processing routines. Additionally, FIG. 2, illustrate how the ECS CCADCH data packet is created, transmitted, recognized, scanned, detected, routed, and processed at the BTS, MSC, PSTN, MCMS and Facilitator centers.

Figure 2:
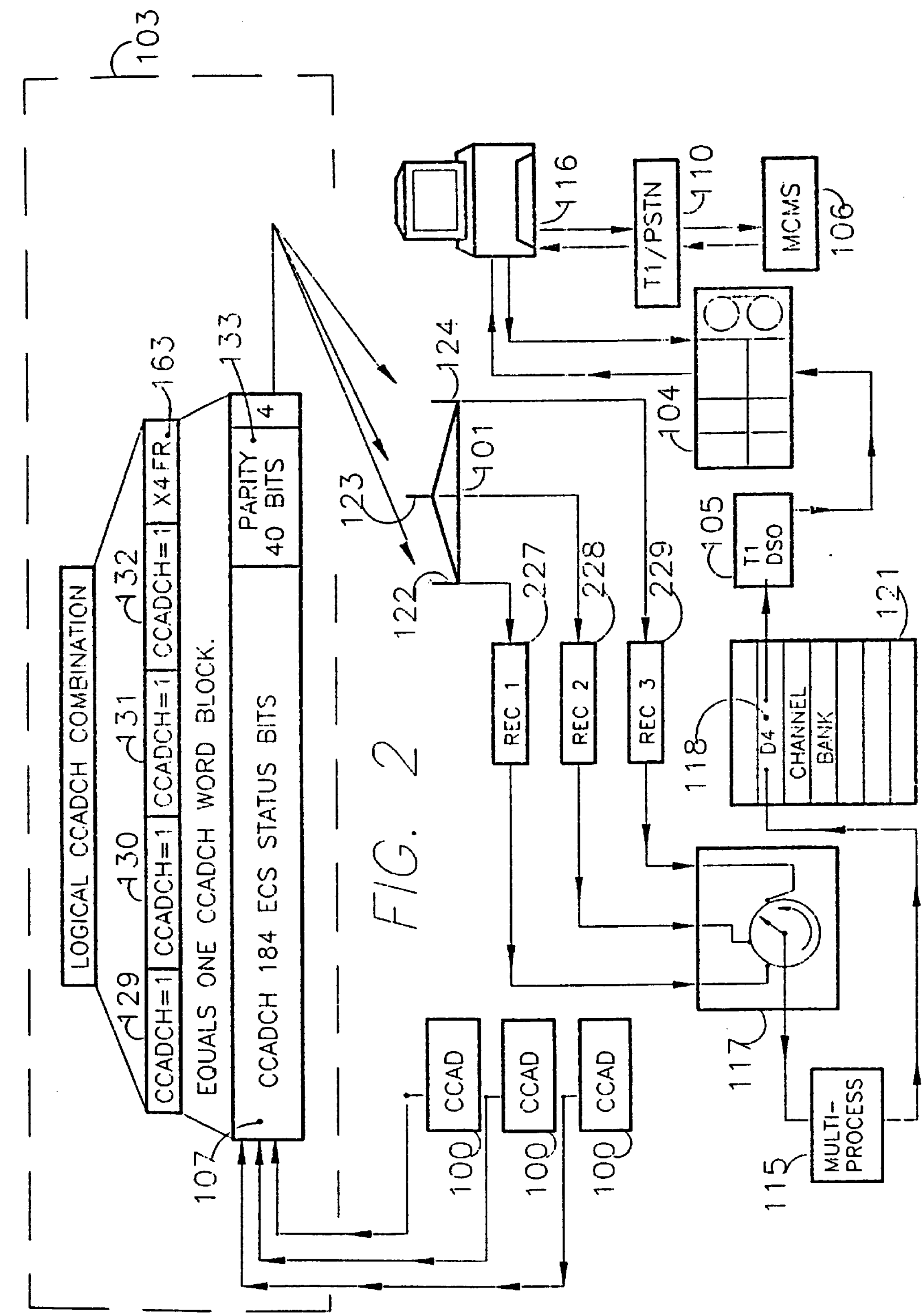
FIG. 2 is a logic flow diagram of continuous control application data channel message data frame combination, and CCADCH processing system according to the invention.
Figure 3:
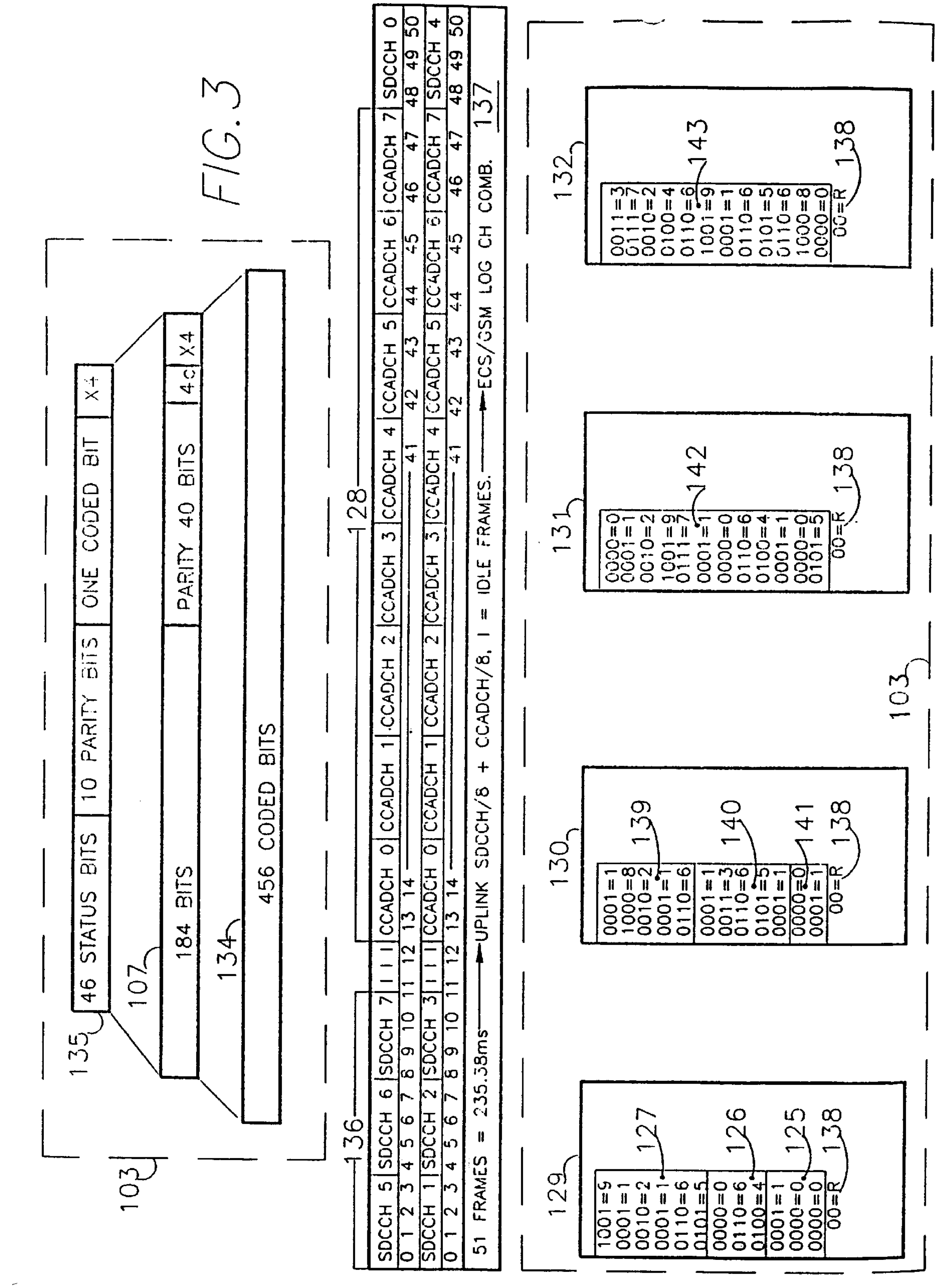
FIG. 3 shows a continuous control application data GSM CCADCH combination IX, channel word block, and multi-burst configuration according to the invention.

Referring to FIG. 2, CCAD data packet 103, utilizes a 184 bit word block designated within the present invention GSM CCADCH version specifications as a logical channel combination 163, and is based upon GSM signaling data format word block 107 that contains a maximum of 184 information bits which are encoded in four burst logical data bit arrangements for use in the GSM time division multiple access (TDMA) 51 multi-frame data layer protocol. In FIG. 3, the four bursts, 129, 130, 131, and 132 contain home arrest location and other status information. In GSM control channel logical channel combinations, it does not make any difference whether the type of signaling information to be transmitted is mapped into a broadcast control channel (BCCH) burst, paging control channel (PCH) burst, sub digital control channel (SDCCH) burst, or a slow associated control channel (SACCH) burst, or four mapped CCADCH bursts, the combined burst 184 bit word block 107 always stays the same.

Referring now to FIG. 2, combined with the required 40 parity bits 133, the word block looks and acts like any other GSM 51 multi-frame word block. This block code belongs to the GSM protocol family of FIRE codes, a coding system that is known in the art, that adds the 40 parity bits at the end of the 184 bits information string. The 40 parity bits are added for the purpose of error correction along with the over all convolution code that adds an additional four zero bits to the end of the string. The coding method repeats the whole string twice, thus deriving a total of 456 bit transmission that fits well into eight sub-slots of 57 bits each, this FIRE coded data is interleaved over the four burst 129, 130, 131, and 132 as depicted in FIG. 3. The first four sub blocks are preferably packed onto the even numbered bits of the four consecutive bursts, and the second four sub blocks are mapped onto the odd-numbered bits of the same consecutive bursts. These various logical formats are designed to perform specific control channel functions in the GSM signaling operations environment. The CCADCH is yet another separate signaling scheme, that is specifically designed to contain and carry application specific data bits such as GPS correlation location position bits, leg band status bits, drug and alcohol consumption status bits, and other previously mentioned ECS status bit information. The CCADCH word block can be transmitted from the ECS communicator during routine GSM mobile terminal location updating, authentication routines and other control channel routines. However, the GSM network may also be configured to utilize the CCADCH combination as a separate and distinct utility protocol.

Referring now to FIG. 3, the CCADCH 184 bit word 107, expressed in fully coded 456 bit terms 134, is a standard GSM TDMA control channel word block. However, it is the information bits contained within these words that the present invention utilizes. Broken down into four bursts, each of the four CCADCH burst 135 or frames of data, that make up a complete coded word block 134 have specific meanings to the CCADCH BTS and MSC processing systems. ECS communicator voice service features are managed by the GSM network as any other GSM communications terminal. However each CCADCH burst or frame is configured in the following manner. CCADCH uses its own number IX combination, however the CCADCH combination can be used with other channel frames such as the Sub Digital Control Channel (SDCCH) that typically is used for user authentication, registration and location verification. In FIG. 3 CCADCH combination IX 137 shows eight TDMA slots dedicated to CCADCH Electronic Capture System (ECS) home arrest subject status data. The SDCCH frames are utilized for normal GSM mobile terminal identification and other purposes. Since ECS communicators also have voice capabilities, the SDCCH frames that contain GSM ECS communicator terminal authentication, registration and system location information, should be closely attached to CCADCH frame bits and can act as preambles to the CCADCH information being transmitted and processed in the same signaling channel combination, hence the creation of the CCADCH unlink, or ECS communicator to base transceiver site (BTS) air interface protocol combination IX 137 that in fact combines SDCCH and CCADCH for application specific purposes. Each SDCCH and CCADCH frame indicator preferably represents a complete GSM TDMA frame. Each frame preferably presents four signaling channel bursts, with 184 bits per burst 107. Each burst or data word 129, 130, 131, and 132, communicates custodial related data. For example in the first burst 129, it contains the subject I.D. number 127, criminal offense code 126. The criminal offense code relates to the exact offense that the home arrest subject was convicted of, this also relates to the level of custodial management or supervision that the subject is designated. For example, if the subject has a history of sex offenses, the code appears within each 184 bit word block that is transmitted and processed. When the packet is received, and the subject has violated his approved route of travel, the criminal code is right there, and stored data does not have to be accessed, therefore relinquishing precious processing time. The next code set relates to correctional status 125. The code tells the MCMS and FAC operator exactly who supervises the subject. This can relate to which county, state, federal and or private correction agency, and the individual assigned agent. Note, that in all four bursts there are reserved bits 138, designated for future use in the CCADCH system. The second burst 130 contains longitude data 139, and latitude data 140 that relate to GPS and other location coordinance correlating systems. Leg band tamper status 141 is also included in the second burst along with its reserved bits 138. The third burst 131 is almost entirely dedicated to transporting biometric implant drug and alcohol measurement data 142, and its reserved bits 138. The fourth burst 132 contains other blood level information data 143 such as adrenaline and other hormone levels that relate to behavior. The fourth burst also has its reserved bits 138.

CCADCH application data is yet another distinct logical channel combination, that represents a separate but compatible control channel process for GSM and that enables the present invention means and methodology. System access protocol control channel signaling procedures must be expanded to include sending application specific data for continuous control application data channel activity. Locating and monitoring the behavior of criminal offenders is a service that dramatically enhances society's ability to monitor and control sociopathic behavior.

As seen in FIGS. 1, and FIG. 2, the CCADCH communications terminal 100 is, preferably configured to operate within the parameters of the Global System for Mobile (GSM) personal communications standard. The CCAD communications terminal 100 transmits a CCADCH data packet 103. The CCAD packet is received by the BTS 101, via an individual sector antenna 122, which is directly attached to a control channel sector receiver 227, that converts air interface protocol to RS232 electrical protocol. The BSC 224 contains a processor 115 that scans all control channel or access channel data packets and detects all CCAD data packets. The present invention provides for a separate sector receiver 227 that is attached in tandem along with a standard control channel BTS receiver. Furthermore, this stand alone receiver 227 is directly attached to a separate and distinct CCADCH data packet processor 115 that operates independent from the BSC processor 224. In this way the methodology described herein can operate and act independently from normal control channel data processing routines. However, the methodology of the present invention can operate seamlessly without the need to add separate BTS and BSC hardware and software. Standard BSC software can be modified to recognize and process CCADCH data packets by simply utilizing a software patch to existing BSC processor software to detect and route CCADCH data packets to the MSC 104 via T1/DSO pathways 105 that are provided by the PSTN 110, that will enable the host GSM cellular network to utilize the present inventions means and methodology without having to add one bit of BSC and BTS hardware. Furthermore, the MSC 104 switch software can be programmed to receive and recognize CCADCH data packets and automatically route said packets to the MCMS 106 via T1/DSO routinely used by the PSTN 110. In fact the entire CCADCH data messaging system can be implemented and integrated with any cellular network and its operations standard with software patch modifications to any and all BTS, BSC and MSCs without any need of adding separate hardware. However, certain cellular network operators may choose to implement CCADCH technology without the necessity of modifying BSC, BTS and MSC operations software, yet still wanting the benefits of the technology. Therefore the present invention provides a CCADCH network overlay system, that in fact creates a separate and distinct CCADCH virtual network that operates in tandem but transparently to the host cellular network. Essentially the present inventions separate hardware and software virtual network approach operates exactly the same way as a CCADCH BSC, BTS and MSC software only modification solution, the primary difference to the software only solution is the addition of radio receivers, separate time division (TDM) multiplexers, and routers at the BTS, BSC and MSC's.

Referring to FIG. 2, the CCADCH data packet 103 is preferably transmitted from the CCAD ECS communications terminal 100 to the BTS, and sector antenna A 122 receives the data packet. Special CCADCH sector receiver one 227 receives the CCAD data packet 103 along with all other control channel and access channel data frames. Sector receiver one converts the air interface TDMA protocol that contains the CCADCH data packet 103 to RS 232 data protocol and routes the data packet to the CCAD BSC multiplexer 117, the multiplexer receives the data packet and routes the packet to the CCAD main BSC processor. The processor scans and detects only CCADCH control channel and access channel data which is then routed to the D4 channel bank 121 and a designated D4 channel bank card 118. For example, the processor scans and detects the CCADCH data packet by recognizing the unique status data multi-frame arrangements contained within 184 bit data TDMA word packet. This application data is transported on a control or signaling logical channel, therefore a the D4 channel bank card converts processor data management protocol into T1/DSO protocol 105, and routes the CCADCH data packet via the PSTN 110 to the MSC 104, whereby the CCADCH MSC processing terminal receives the data packet, processes it and routes it to the MCMS 106 via the PSTN 110 for further facilitator processing.

As further shown in FIG. 2, the multiplexer 117 can handle up to three separate sector receivers. For example, shown here are three CCADCH home arrest communications terminals 100 that transmit three separate GSM CCADCH data packets, the multiplexer receives each one, at slightly different time increments. Depending upon which of the three packets arrives at the multiplexer from the three sectors antennas and receivers, it is then sent to the processor 115 on a first come first serve basis. The multiplexer is synchronized to the cellular control channel access channel synchronization TDMA-clock, to maintain timing accuracy. Sector antennas (a) 122, (b) 123, and (c) 124, can fully load the sector receivers (a) 227, (b) 228 and (c) 229, with data packets and the CCADCH multiplexer will process all incoming data packets at full network traffic load without loss of system efficiency.

Figure 4:
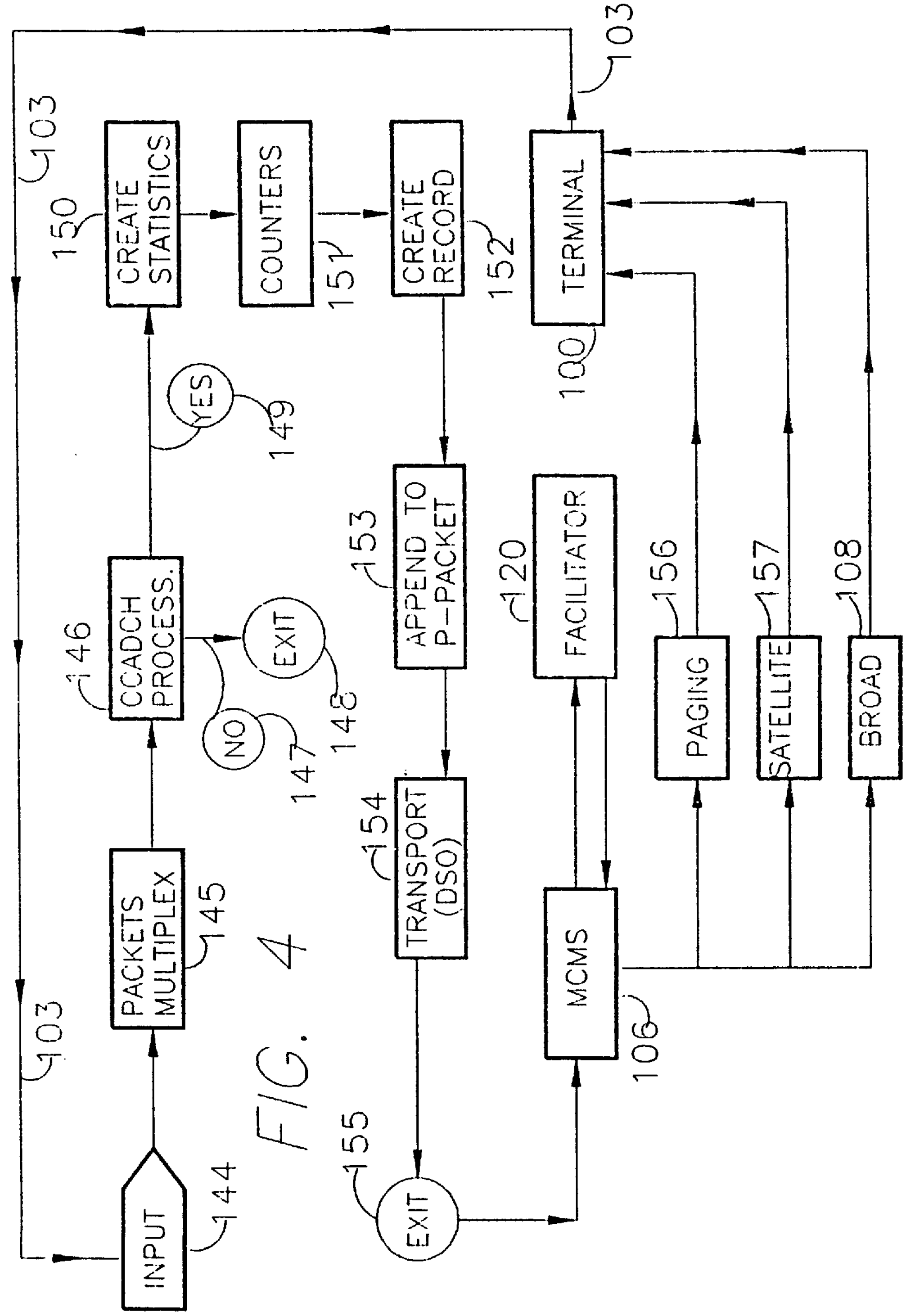
FIG. 4 shows a logic flow chart of the data packet processing routine, and base transceiver system and mobile switching center according to the invention.

FIG. 4 is a logic flow diagram of the CCADCH data packet being processed at the BTS, BSC, MSC and MCMS. When a CCADCH communications terminal 100 is turned on, must be oriented itself within the GSM network. The CCADCH communications terminal does this in three steps. First, it synchronizes itself in frequency, then in slot assignment time. Finally, it reads the system and cell data from the BTS channel or, more specifically, from the broadcast control channel (BCCH). This procedure is purely passive; no messages are exchanged. The first task is to find which frequency the forward control channel FCCH, the signaling control channel SCH, and broadcast control channel are being transmitted. In the GSM cellular system, a BTS must transmit something in each time slot of the BTS channel. Even if these time slots are not allocated to communication with any regular mobiles or CCADCH ECS communicators, the BTS has to transmit predefined filler or dummy bursts, much in the same way that AMPS and TACS cellular transmits filler data on the overhead or idle channels. If the BTS, taxed with the broadcasting the BTS channel, fills all its time slots, then the power density from this frequency is higher than that for any of the other channels in the cell, which may have only a few time slots out of eight allocated. The peculiarity of the BTS makes it easy for a mobile or CCADCH ECS communicator to find its frequency. The CCADCH ECS communicator 100 simply scans for the physical channels with the highest apparent power levels. After finding one of them, the CCADCH ECS communicator searches for the FCCH. The FCCH is easy to find once the BTS channels is located. After the CCADCH ECS communicator synchronizes with the system in the frequency domain, it proceeds to do the same in the time or data domain. The CCADCH ECS communicator uses the SCH for the second step, but it has already found the FCCH, so it already knows that the SCH will follow in the next TDMA frame. From the SCH the CCADCH ECS communicator gets information about the current frame number and the BTS's training sequence. With this information received on the SCH, the BCCH is clearly read by the CCADCH ECS communicator, and it reads the location of the BTS, any options of interests, and how to access the particular BTS. All three of the synchronization steps take somewhere between two and five seconds to accomplish, but this is not effecting system capacity yet. Once the CCADCH ECS communicator 100 performs these passive tasks, it transmits or bursts its application specific packet 103 in the 51 multi-frame format. INPUT 144 represents the BTS and BSC, receives the CCADCH ECS data packet 103, with other data packets are multiplexed 145, scanned and rejected as No 147 and data tossed via Exit 148, or identified by electronically detecting the unique CCADCH I.D. data arrangement contained within the data packet, that is usually assigned to the same frame number such as zero. In the GSM platform, the zero frame is used almost exclusively for 51 multi-frame signaling data in coordination with the authentication and registration SDCCH frames existing on the same physical channel, and accepted as YES 149, the processor creates a statistic 150, counts the transaction 151, records the transaction 152, appends the statistical record to the processed CCADCH data packet 153, converts the CCADCH data packet to T1/DSO 154 and sends processed CCADCH data packet to the MCMS 106 via the PSTN exit 155. Once the CCADCH data packet 103 is visually expressed in directed arrows from the home arrest terminal 100 to the input 114, and the block description CCADCH P 103 arrives at the MCMS, the data packet with appended statistics are examined, recorded, processed and various status determinations are made. If the CCADCH data packet contains GPS and other pertinent information that signifies to the MCMS a particular requirement to; (a) update a CCADCH user's location on the SDCCH, (b) send an alpha numeric message to cause the subject to perform some manual human interface function, (c) send data command message that causes the CCADCH communications terminal to automatically respond to the command by transmitting new CCADCH data packets in the aforementioned manner, or (d) specially instructs the CCEM subject to stand and physically open his communicator to allow for clear line-of-sight access to GPS satellite signals, then the MCMS sends a command and instruction message.

Figure 6:
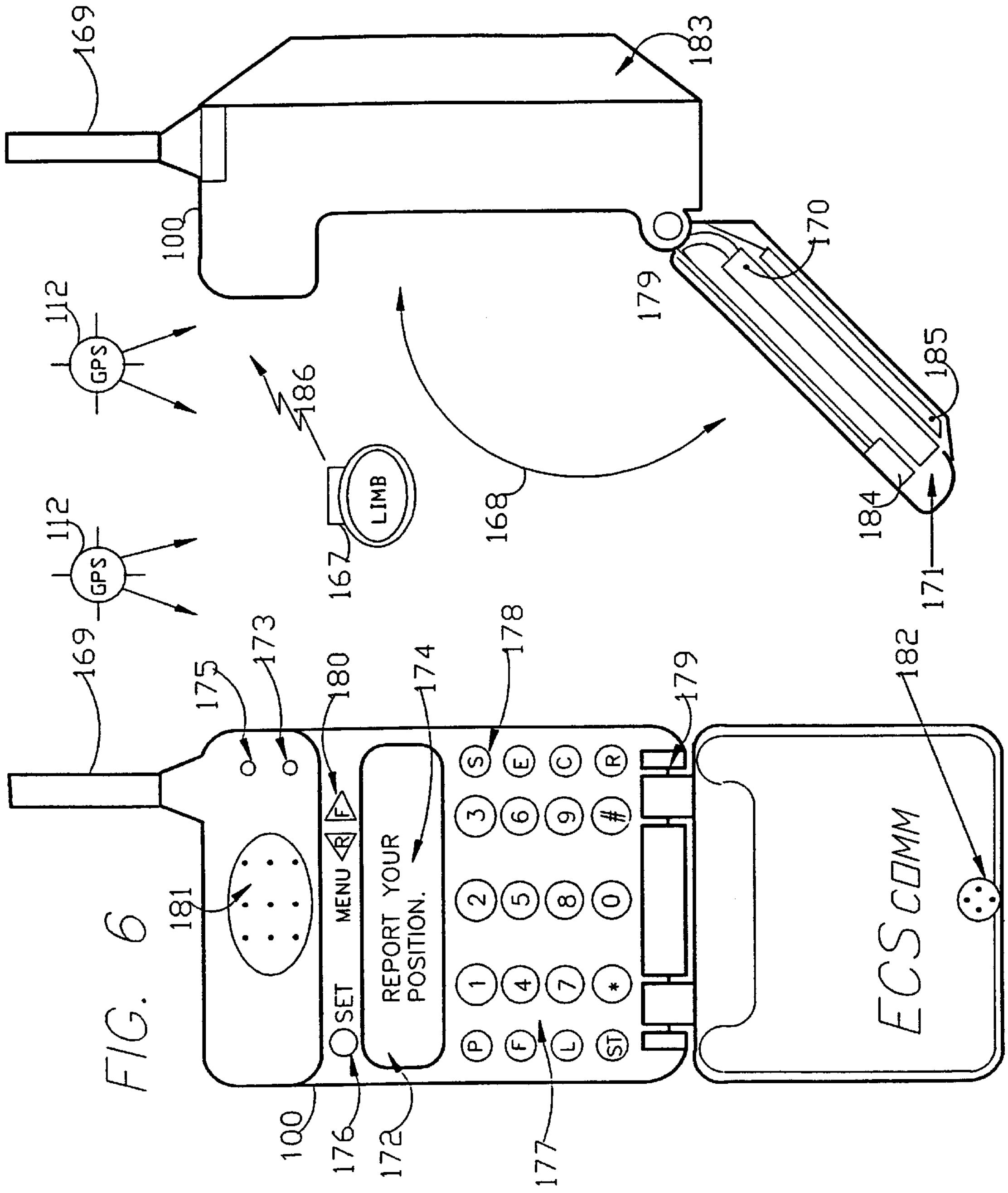
FIG. 6 is an illustration of a frontal and side view of the GSM CCADCH mobile communications terminal, according to the invention.

Referring to FIG. 6, the CCADCH communications terminal 100 is shown in open mode 168, after the subject was paged with an audible beep and a flashing red LED indicator 173. This procedure allows for the enclosed GPS antenna 170 located in the microphone flip out housing 171 of the communicator to have a clear line-of-sight access to the GPS Navstar satellites 112 orbiting the Earth. The GPS antenna 170 that is inside the GPS flip out housing 171, also has connected GPS satellite signal processing board 185, this design allows for the placement of a GPS signal processing board inside of a small physical space. This flip out housing allows the user to simply hold the terminal GPS antenna housing 171 in the open fold out position 168 in clear line-of-sight the open sky in order pick up the radio signals from GPS satellites that contain the data timing increments. Once the location timing codes are received and correlated, the communicator audibly beeps and flashes the green LED 175, and tells the subject that a new position coordination has been achieved, and CCADCH packet has been transmitted, and he can then fold the housing closed and go on about his business. This allows for a compact unit and has the physical appearance of a normal cellular phone. This is important for successful assimilation of criminal offenders, whom seek successful reintegration into society without having to utilize a separate and distinct looking home arrest communicator.

In FIG. 6, the ECS communicator 100 is configured to look and operate as normal GSM cellular communications terminal, but with many additional unique features and functions. The ECS communicator 100 preferably has a normal key pad 177, a liquid crystal display (LCD) 172, a send button 178 for placing normal voice calls , a set of menu scroll buttons 180, and a set button 176 used for instructing the ECS communicator to perform the task indicated by the LCD display once the selection has been made from the displayed menu, such as reporting the present position 174. This can be performed by the subject independently, or by receiving a command instruction from the correctional facilitator. The ECS communicator has a non retractable whip antenna 169 that is designed to withstand a great deal of wear and tear. This antenna is designed to receive standard cellular radio signals, paging network signals, and satellite signals. The GPS satellite signals 112 are received solely by the embedded GPS antenna 170 that is an integrated part of the ECS communicator 100 design, and the physical appearance of the GPS antenna does not disrupt the normal look of the ECS communicator, for it resides inside of regular flip out microphone housing 171, that is attached to the main body of the ECS communicator with a robust hinge 179. The ECS communicator also contains an earpiece speaker 181, a microphone 182 that is embedded next to the GPS antenna via a special mount 184. The ECS communicator also has a large capacity storage battery 183. Leg band 167, preferably transmits a data radio wave to the ECS communicator 100, with an effective range of about one hundred feet. If the subject places the communicator down, and leaves its detection proximity, the communicator will transmit a data packet to the nearest base transceiver station.

Figure 7:
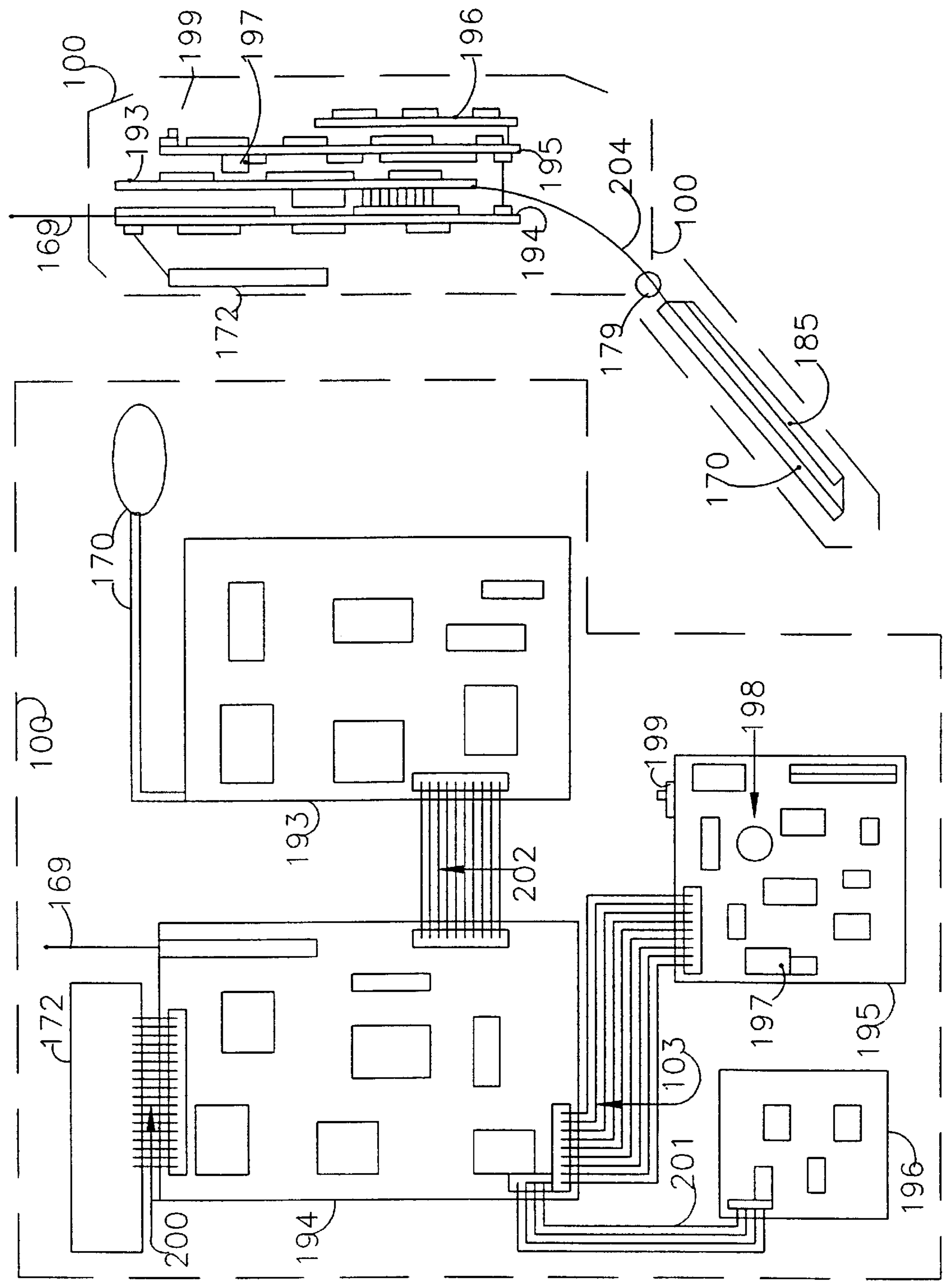
FIG. 7 is an illustration of an exploded view of the GSM CCADCH mobile communications terminal, according to the invention.

Referring to FIG. 7, this illustration depicts the main component parts of the ECS communicator accordingly to the preferred embodiment of the invention, that include the cellular transceiver board 194, the GPS receiver board 193, the paging receiver board 195, the leg band transmission signal receiver board 196, and the GPS antenna 170. The whip antenna 169 is preferably attached to the cellular transceiver board, but all components of the ECS communicator are joined together physically and electrically by ribbon cables. These ribbon cables connect the cellular transceiver board and the GPS receiver board 202, the cellular transceiver board and the paging receiver board 203, the cellular transceiver board, the leg band receiver board 196, the LCD display, the cellular transceiver board 200, and the GPS antenna to the GPS receiver 204. The paging receiver board 195 preferably contains an independent on and off switch 199, a movement vibrator 197 and an audible speaker 198. The LCD screen displays all messages that pertain to any and all of the messages that the separate of integrated components receive. The LCD display all project low battery indicators, system trouble and many other important indicator messages.

As further shown in FIG. 4, the CCAD communications terminal can receive commands, alpha numeric instructions, and other alpha numeric messages from various communications mediums. The CCAD communications terminal can be supplied with a paging receiver, a satellite receiver, a cell broadcast BCCH receiver or the terminal can receive the aforementioned messaging from the host cellular systems forward analog and digital control channel, analog and digital reverse control channels, paging channels, overhead channels, and digital traffic channels. The MCMS 106 may send instructions and command messages form a paging network 156, or chosen satellite network such as Inmarsat P 157, or by GSM cell broadcast 108.

Figure 5:
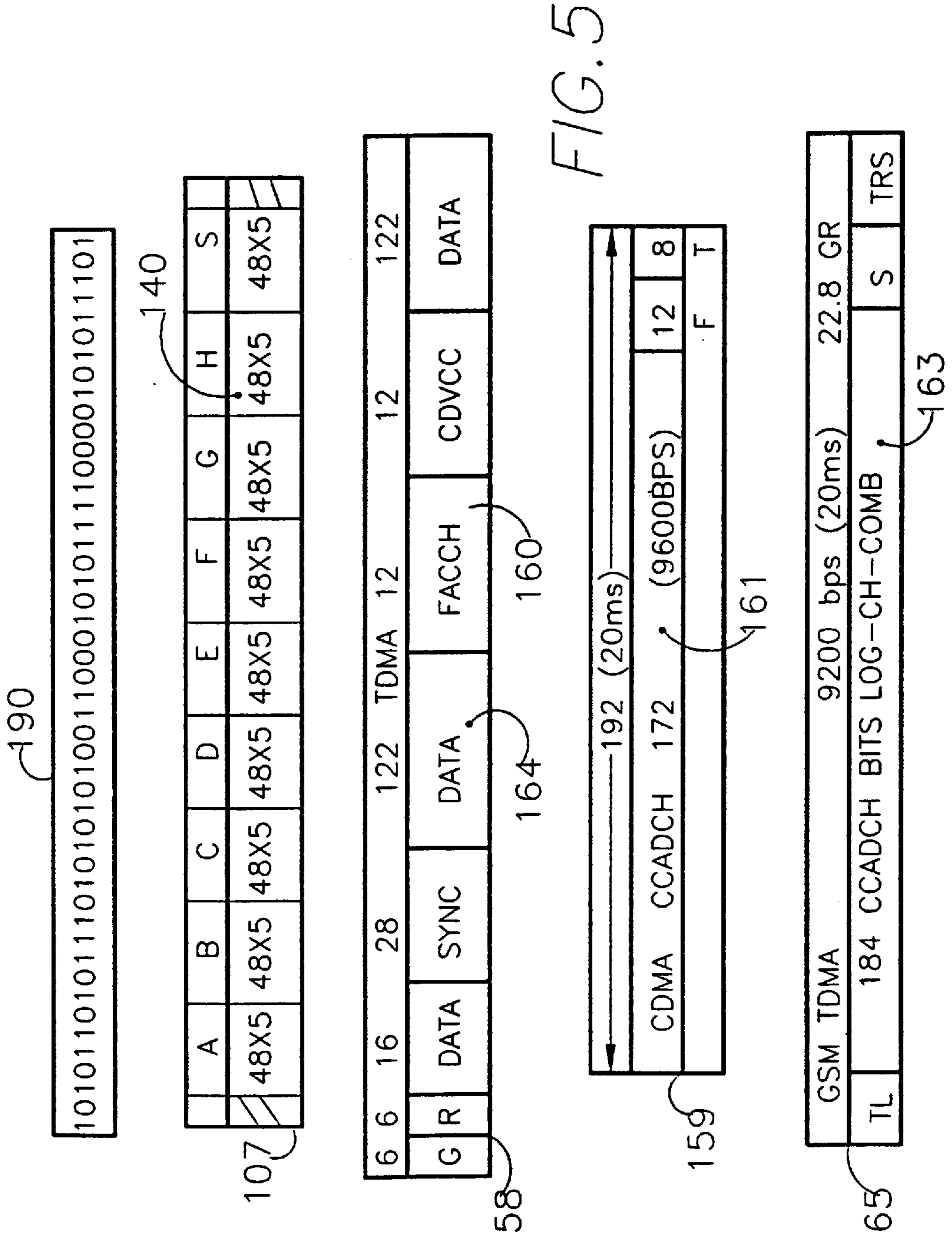
FIG. 5 shows a block diagram of five different continuous control application data channel protocols used by the invention, according to the invention.

Referring to FIG. 5, the method of the present invention can utilize any control channel, access channel and signalling channel protocol. For example a CCAD data packet can be tagged onto or integrated with an RECC FSK autonomous registration packet 107 with a contained H word 140, an IS-54/IS-136 DAMPS TDMA access channel and control channel data packet, with the application data contained in the CCADCH burst 160 and the user data burst 164. Additionally, the CCADCH data packet can be contained with an IS-95 narrow band spread spectrum control channel and access channel data frame 159. The CCADCH word can be made up of a 172 bit CDMA coded burst 161, a 122 bit TDMA user data burst 164, and the U.S. TDMA CCADCH burst 160, contained within the same data frame.

Figure 8:
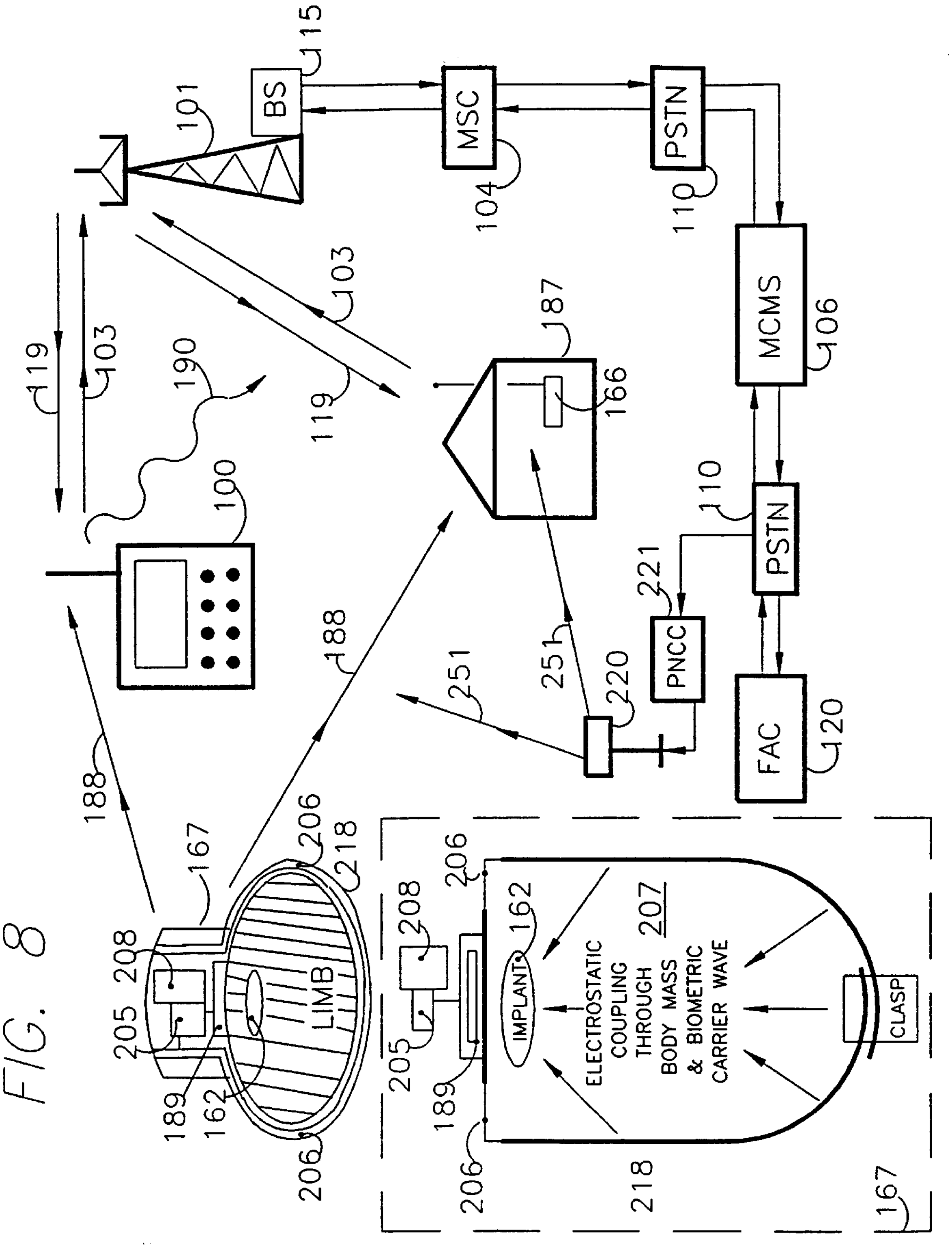
FIG. 8 is an illustration of the leg/wristband with biometric sensor, according to the invention.
Figure 9:
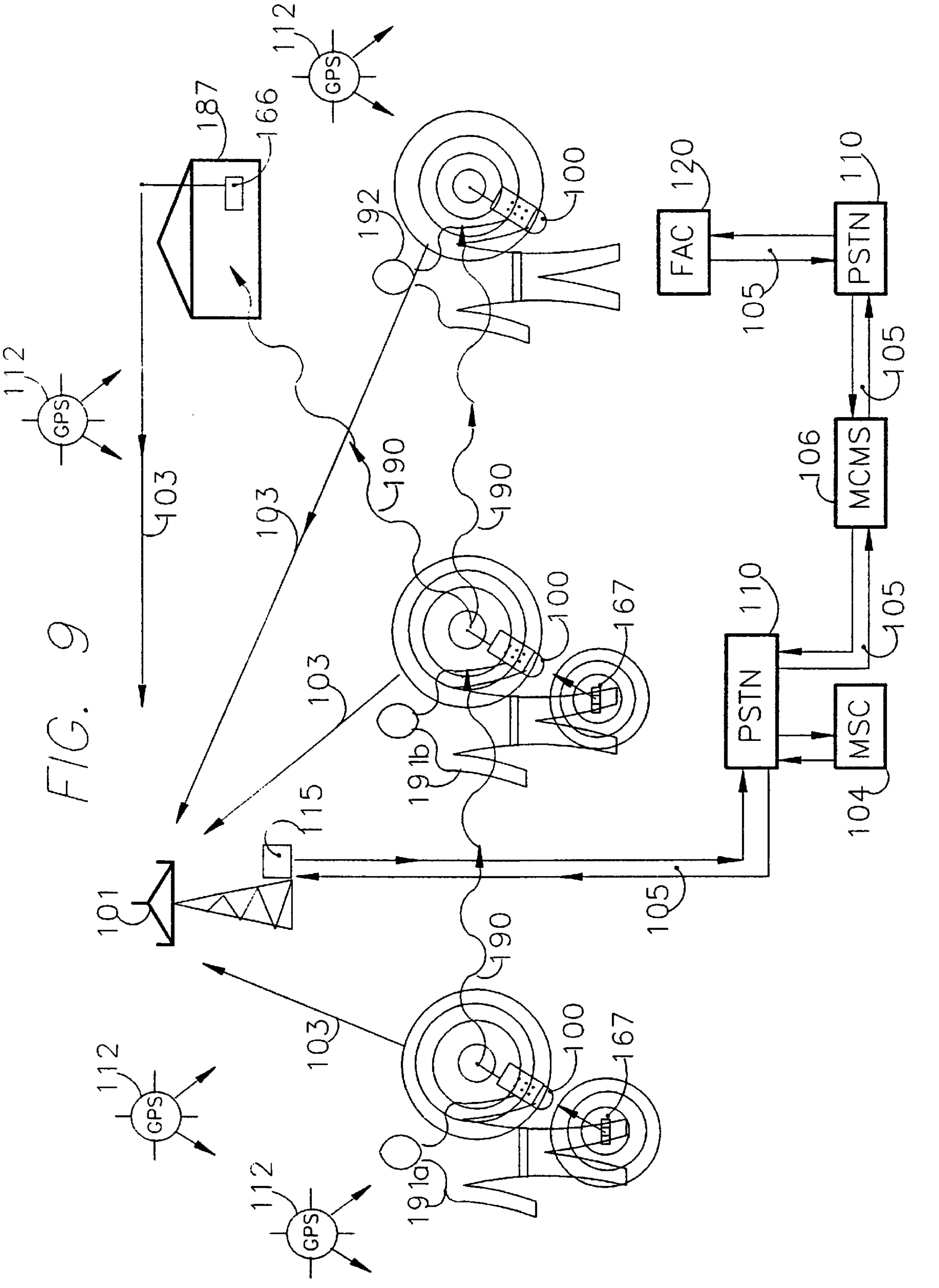
FIG. 9 is an illustration of the CCADCH stationary communications terminal, according to the invention.

Referring to FIG. 8, and FIG. 9, both illustrations show the ECS system in use. In FIG. 8, the leg band 167 contains a radio transmitter module 208 that transmits data in the 900 Mhz range 188 to the mobile ECS communicator 100 and the stationary ECS communicator 166. Another leg band component is the biometric implant code transceiver 205, that also serves as an electrostatic field integrity detection plate. The biometric implant 162, is a passive device that detects various substances that may be present in a home arrest subject's blood such as illegal drugs and unauthorized alcohol content. The Biometric implant also measures blood hormone levels such as adrenaline and other hormones that relate to a home arrest subject's emotional state. The passive biometric sensor 162 is activated by directing a carrier wave 207 from an external source such as a wand or scanner device that is typically utilized in a laboratory setting for tracking laboratory animals, and performing biochemical diagnostics. For ECS, the leg band biometric transmitter 208, acts as a wand that transmits a biometric carrier wave that travels through the leg band conductors 206, which causes the biometric implant to activate and release its data into the eletrostatic carrier wave that travels through the body mass 207, that is detected by the electrostatic detection plate 189.

In FIG. 8, the leg band reads the data being released by the biometric implant 162 and transmits the released data to the ECS communicator 100. The ECS communicator 100 is programmed to receive the biometric implant data, along with tamper data and subject identification data, and store and then relay the data to the cellular network via the aforementioned control channels. The leg band data is contained in the data packet 103 of the CCADCH protocol, in this case the GSM 8 slot TDMA 51-multi-frame control channel and signaling channel protocol. This same leg band data carried in the CCADCH packet 103 is transmitted to the base transceiver site 101 and processed 115 in the aforementioned manner, relayed to the mobile switching center (MSC) 104, processed, routed and forwarded to the master central monitoring station (MCMS) 106, via the PSTN 110, and processed in the aforementioned manner. The MCMS 106 sends the CCADCH data packet 103 to the correctional facilitator 120, whereby the facilitator sends a command message request back to the MCMS 106. The MCMS 106 subsequently sends a command message to the paging network control center (PNCC) 221 via the PSTN 110. Once PNCC receives the command 251 and transmits it to the ECS subject's mobile communicator 100, and or the stationary communicator 166 via the paging network's transmission tower 220. The ECS mobile communicator 100 also transmits a shortened burst of data 190, for identification and detection purposes. Another way of sending command messages to the ECS home arrest subject is by utilizing cell broadcast transmissions 119. Within the operational parameters of various cellular platforms such as Global System for Mobile, a system similar to normal paging is in place that enables point-to-omni-point broadcasts that contain all sorts of information such as weather reports, road condition reports, advertisements and other related one way communications. The GSM cell broadcast pathway BCCH can be used to send specialized coded command designated for individual ECS home arrest subjects to perform some sort of custodial related function, such as standing and opening up the CCADCH ECS communicator and obtaining a new GPS location coordinance. Also these cell broadcast pathways can be utilized to instruct all ECS home arrest subjects in a given geographic service to perform some sort of custodial related function. Cell broadcast pathways are also called broadcast control channels (BCCH).

Referring to FIG. 5, the shorted burst 190 is a 46 to 48 bit TDMA or CDMA word that identifies the subject. This burst is transmitted every five minutes or so, and only has about a thousand foot range. This shortened burst protocol is digital TDMA, but does not operate on the control channels and is detectable only by other ECS mobile and stationary communicators. FIG. 9, illustrates the ECS system in action. Two home arrest subjects 191*a* and 191*b* are traveling in the proximity of a base transceiver site (BTS) 101. Each subject's ECS communicator 100 are transmitting a CCADCH data packet 103. Each subject has a leg band 167, underneath the leg band is an implanted biometric sensor as illustrated in FIG. 162. In FIG. 9, each subject's ECS communicator 100 is transmitting a special shortened burst 190. This shortened burst 190, that contains a unique data code, that transmits in the 900 Mhz to 2 Ghz range, and identifies the individual user. Each ECS communicator is designed to detect this shortened burst carrier wave and the data contained within the data wave. If one subject, for example, such as subject 191*a* comes within 500 to 1000 ft of another home arrest subject both ECS communicators report the incident on the control channels utilizing the present inventions CCADCH data packet 103 protocol. In another scenario, if home arrest subject 191*b* travels within 500 to 1000 ft of another home arrest subject's stationary communicator 166 installed at his place of residence 187, the stationary communicator 166 will detect the 900 Mhz carrier wave of the shortened burst signal, and transmits its own CCADCH data packet 103. In still yet another scenario home arrest subject 191*b* travels within 500 to 1000 ft of a client of a home arrest program 192. A client of a home arrest program is a person whom is placed in a court ordered protection program. A protection program is designed to track offenders whom commit; (a)spousal abuse, (b) have a criminal history that involves various sex offenses, including child abuse, rape and other related sociopathic behavior. These protection program are also called Keep Away Programs. In a keep away program, the courts not only sentence the subject offender to curfews, and confined daily routes of travel to his work place and stores, etc., the home arrest subject is monitored and tracked to be forced to stay away from his former spouse whom also carries an ECS communicator, and additionally has one placed at her home. If the home arrest keep way subject 191*b* travels within 500 to 1000 ft of the clients house 187 the stationary ECS communicator 166 transmits a CCADCH data packet to the MCMS 106 via the host cellular network in the aforementioned manner. In yet still another scenario, subject 191*b* is place in a home arrest program because he is a convicted offender. The court orders that he stay away from public and private institutions where children congregate such as schools, playgrounds, churches, boys and girls clubs etc. The ECS stationary communicator 166 is placed at a school 187 and the home arrest subject 191*b* travels within a 500 to 1000 ft of the school, the stationary communicator detects the shortened burst carrier wave 190 and the MCMS 106 and Correctional Facilitator 120 is notified in the aforementioned manner. The ECS mobile communicator 100 can be configured to send the shortened 900 Mhz signal up to a 1000 yards. Also the shortened burst is not limited to operating only within the 900 Mhz frequency range. The ECS communicator can be configured to transmit the shortened burst in any assigned frequency or modulation scheme so authorized by the Federal Communications Commission F.C.C. The ECS mobile and stationary communicators utilize the same leg band carrier wave receiver to detect and recognize the shortened burst carrier wave, that is used to detect the home arrest subject's leg band. However the ECS mobile and stationary communication can be configured to have a separate radio receiver in case the operating frequencies assigned to the leg band and shortened burst carrier wave are different.

Figure 10:
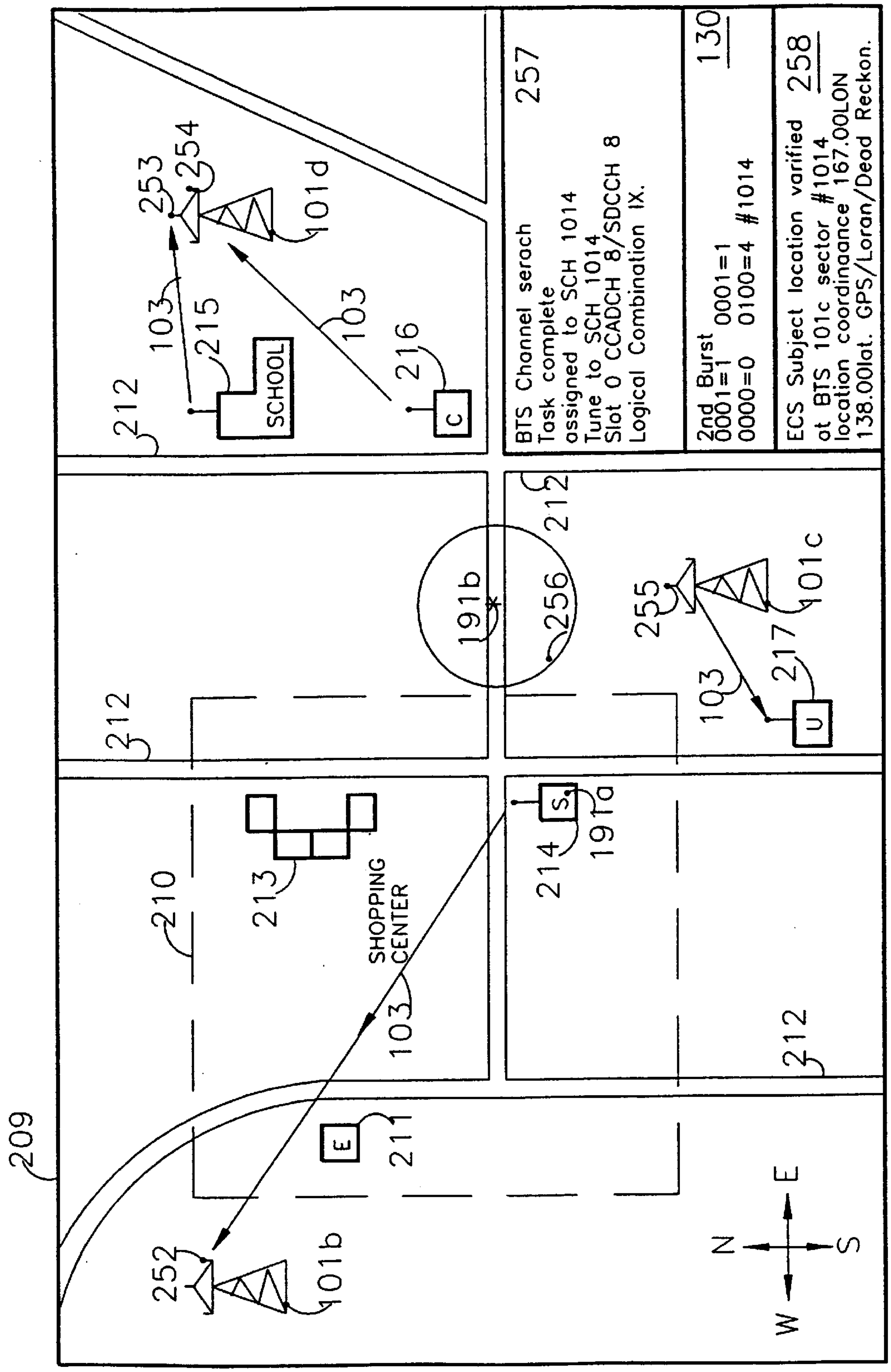
FIG. 10 is a diagram of a topographical cellular and GPS scanscape, according to the invention.

Referring to FIG. 9 and FIG. 10, there are other means and methodologies of notification, identification, location, movement tracking, and apprehension of home arrest subject program violators that in fact extend the leg band and ECS communicator interaction. There are three separate but converging layers of location and relative position verification that operate within the parameters of the Electronic Capture System (ECS). In FIG. 10, which depicts a location topographical display 209 of a CRT monitor in a master central monitoring center and a correctional facilitator center. This map illustration shows cellular transmission towers 101*b*, 101*c* and 101*d*, with sector cells 252, 253, 254 and 255 with assigned control channel frequencies, symbols that represent city streets 212, a school 215, shopping center 213, place of a subject's employment 211, subject's residence 214, client 216, and an authorized area of travel quadrant 210, and GPS satellites 112.

Each base transceiver station (BTS), 101*b*, 101*c* and 101*d* has three sector cells. Each sector cell is assigned up to fifteen voice or traffic channel frequencies. Additionally it is important to note here is that each sector cell is assigned one control channel frequency. Methodologically important for the ECS system is the following: First, the stationary communicators located at the school 215, the home arrest subject 214, the client the unauthorized person's residence 217 are all assigned to a particular BTS sector and access channel frequency. For example, the stationary communicator placed at subject 191*a*'s residence 214 is assigned and tuned to sector c 252 with an assigned control channel number 332. The school's 215 stationary communicator is assigned to sector b 253 of BTS 101*b* with an assigned control channel number 316. The client's 216 stationary communicator is assigned sector c 254 with a channel number 327. If home arrest subject 191*b* has been instructed to keep away from all other home arrest program participants, for example another home arrest subject resides at the house "U" 217, for unauthorized contact, his stationary communicator is assigned to BTS 101*c*, sector cell b with a physical control channel number of 1012 in TDMA frame 0. Frame or slot 0 is utilized primarily for control channel operation in GSM 900 Mhz, GSM DCT-1800, and GSM-1900 standards. Each sector antenna is highly directional, and if an attempt to change the position of the stationary communicator is made by the subject or anyone else, radio contact will be lost, the MCMS system will notice the loss of routine control channel radio contact, and custodial personnel will be notified by sending a violation notice to the custodial facilitator, and individual assigned custodial agent. Also, the stationary communicator has movement sensors, if the unit is moved, the MCMS will be notified via the host cellular systems control channels and the present invention's detection and processing system.

FIG. 10 represents a topographical display where each BTS position on this map display represents a longitude and latitude position, as do each subject's place of employment 211, residence 214, and client's place of residence 216. Quite simply, each stationary communicator is placed at a residence, school or other building structure. Each structure has a permanent map coordinate, that is recorded at the correctional facilitators central monitoring facility. Therefore, when a home arrest subject's 191*a* ECS mobile communicator transmitted shorted burst comes within a predetermined range of his own authorized stationary communicator 214, it transmits confirmation data 103 over the host cellular network's control channels 252. Conversely, if the home arrest subject 191*b* comes within a predetermined range of a client's or unauthorized stationary communicator 217 violation data is transmitted from that stationary communicator 217 to the nearest BTS 101*c* and the assigned control channel 255. In FIG. 10 the CRT location topography display 209, depicts a square quadrant of authorized travel for home arrest subject 191*a* and 191*b*. This quadrant or approved sector of travel will allow each home arrest subject to go to a shopping center to purchase goods 213, go his place of employment, 211 and travel home over city streets 212. However, if one of the home arrest subject travels out of his assigned and authorized quadrant or sector of travel, the Master Central Monitoring Station (MCMS) will be notified immediately. Detection of authorized or unauthorized travel will be verified by the following means and methods. First, since each BTS 101*b*, 101*c* and 101*d* has three sector cells, and each is assigned its own channel number, the home arrest subject control channel carrier wave and data will communicate to the nearest sector. The MCMS terminal processing software is configured to know which control channel number is assigned to which BTS. The ECS mobile and stationary communicator like all GSM cellular telephones, reads the strongest BTS channel within the data bits of this forward control data that is this particular ECS communicators current control channel assignment. Unlike other cellular communicators, the ECS communicators are designed to transmit its control channel assignment, for example channel number 331 to the Master Central Monitoring Station (MCMS) via the control channels of the host GSM cellular network. Referring to FIG. 10, the lower corner of the CRT display 209, depicts an BTS channel message 257 received by an ECS communicator with the assigned control channel 1014. The CCADCH data packet, second burst 130 can also contain BTS channel assignment as an alternative to leg band tamper status. This information is preferably sent numerous times during the day. The MCMS terminal readout 258, shows the most recent control channel assignment transmitted by the home arrest subject's ECS communicator. This information also includes the longitude and latitude position transmitted the subject's ECS communication. This position information is derived from the ECS communicator's GPS receiver, Loran C transceiver or dead reckoning receiver. In one possible scenario, once an authorized travel violation has occurred, all ECS home arrest subjects are required to establish their present location, by being notified by the paging network to perform the aforementioned location task. Once this is accomplished, custodial facilitator staff will know exactly where all ECS home arrest subjects are, and the violators of assigned authorized travel routes can be notified and or apprehended. Alternatively, that the ECS communicator may be supplied with a location system that continually transmits accurate information without GPS satellites. For example, methods utilizing BTS triangulation, sector cell triangulation, overhead signal timing marks, and the like are possible.

Additional advantages and modifications will readily occur to those skilled in the art. Therefore, the invention in its broader aspects is not limited to the specific details, representative devices, and illustrative examples shown and described. The present invention's methodology is also applicable to communications systems such as narrow band personal communications systems (NPCS), the proposed Iridium Satellite system, the Teledisc "brilliant Pebbles" satellite system proposed, and the like. Accordingly, departures may be made from such details without departing from the spirit or scope of the general inventive concept as defined by the appended claims and their equivalents.

What is claimed is:

1. A method for communicating subject status information between a subject and a central monitoring station utilizing a wireless communications network that includes a voice channel and a control channel wherein the voice channel conveys data signals and the control channel conveys control signals that manage access to and use of the voice channel, the method comprising the steps of:

a) transmitting a subject status data message from a radio collar coupled to the subject to a communicator;

b) encoding the subject status data message at the communicator to create an encoded subject status data message for transmission over the control channel as control signals;

c) transmitting the encoded subject status data message over the control channel as control signals to a mobile switching center (MSC), bypassing the voice channel;

d) decoding the encoded subject status data message at the MSC to retrieve the subject status data message;

e) transmitting the subject status data message over a switched telephone network to a central monitoring station (CMS); and f) transmitting a command message from the CMS to the communicator.

2. The method of claim 1, wherein the step of transmitting a command message from the CMS to the communicator includes the step of transmitting a command message from the CMS to the communicator over a paging network.

3. The method of claim 1, wherein the step of transmitting a command message from the CMS to the communicator includes the step of transmitting a command message from the CMS to the communicator over a satellite network.

4. The method of claim 1, wherein the step of transmitting a command message from the CMS to the communicator includes the steps of:

a) transmitting a command message from the CMS to the MSC over the switched telephone network;

b) encoding the command message at the MSC to create an encoded command message for transmission over the control channel as control signals;

c) transmitting the encoded command message from the MSC to the communicator over the control channel as control signals, bypassing the voice channel; and d) decoding the encoded command message at the communicator to retrieve the command message.

5. The method of claim 1, wherein the step of transmitting a subject status data message from a radio collar coupled to the subject to a communicator includes transmitting data identifying the subject.

6. The method of claim 1, wherein the step of transmitting a subject status data message from a radio collar coupled to the subject to a communicator includes transmitting data identifying a present location of the subject.

7. The method of claim 1, wherein the step of transmitting a subject status data message from a radio collar coupled to the subject to a communicator includes transmitting status information regarding operation of the radio collar.

8. The method of claim 1, wherein the step of transmitting a subject status data message from a radio collar coupled to the subject to a communicator includes transmitting information regarding a criminal conviction of the subject.

9. The method of claim 1, wherein the step of transmitting a subject status data message from a radio collar coupled to the subject to a communicator includes transmitting supervisory information regarding authorities responsible for supervising the subject.

10. The method of claim 1, wherein the step of encoding the subject status data message at the communicator to create an encoded subject status data message for transmission over the control channel as control signals includes manipulating a Global System for Mobile communications (GSM) control channel frame to create a manipulated GSM control channel frame that includes at least a portion of the subject status data message for transmission over a GSM control channel as the control channel frame.

11. The method of claim 10, wherein the step of transmitting the encoded subject status data message over the control channel as control signals to a MSC, bypassing the voice channel, includes the step of transmitting the manipulated GSM control channel frame that includes at least a portion of the subject status data message over a GSM logical control channel to the MSC.

12. The method of claim 1, wherein the step of encoding the subject status data message at the communicator to create an encoded subject status data message for transmission over the control channel as control signals includes manipulating an autonomous registration reverse control channel message at the communicator to create a manipulated autonomous registration reverse control channel message that includes at least a portion of the subject status data message for transmission over the control channel as control signals.

13. The method of claim 12, wherein the step of transmitting the encoded subject status data message over the control channel as control signals to a MSC, bypassing the voice channel, includes the step of transmitting the manipulated autonomous registration reverse control channel message over the reverse control channel, bypassing the voice channel.

14. The method of claim 2, wherein the step of transmitting a command message from the CMS to the communicator over the paging network comprises the steps of:

a) transmitting the command from the CMS over the switched telephone network to a paging network control center; and b) transmitting the command from the paging network control center over the paging radio communications network to the communicator.

15. A method for communicating a violation condition involving a remotely monitored subject from a communicator to a central monitoring station utilizing a cellular radio communications network that includes a voice channel and a control channel wherein the voice channel conveys data signals and the control channel conveys control signals that manage access to and use of the voice channel, the method comprising the steps of:

a) transmitting a subject status data message from a radio collar coupled to the subject;

b) periodically attempting to detect the subject status data message at a receiver coupled to the communicator; and c) if the receiver fails to detect a number of subject status data messages transmitted by the radio collar, or if the subject status data message indicates a violation condition, then:

1) generating a violation status data message for transmission to the central monitoring station;

2) encoding the violation status data message at the communicator to create an encoded violation status data message for transmission over the control channel as control signals;

3) transmitting the encoded violation status data message over the control channel as control signals to a mobile switching center (MSC), bypassing the voice channel;

4) decoding the encoded violation status data message at the MSC to retrieve the violation status data message; and 5) transmitting the violation status data message over a switched telephone network to a central monitoring station (CMS).

16. The method of claim 15, further including the step of transmitting a command message from the CMS to the communicator.

17. The method of claim 15, wherein the step of transmitting a command message from the CMS to the communicator includes the step of transmitting a command message from the CMS to the communicator over a paging network.

18. The method of claim 17, wherein the step of transmitting a command message from the CMS to the communicator over the paging network comprises the steps of:

a) transmitting the command from the CMS over the switched telephone network to a paging network control center; and b) transmitting the command from the paging network control center over the paging radio communications network to the communicator.

19. The method of claim 15, wherein the step of transmitting a command message from the CMS to the communicator includes the step of transmitting a command message from the CMS to the communicator over a satellite network.

20. The method of claim 15, wherein the step of transmitting a command message from the CMS to the communicator includes the steps of:

a) transmitting a command message from the CMS to the MSC over the switched telephone network;

b) encoding the command message at the MSC to create an encoded command message for transmission over the control channel as control signals;

c) transmitting the encoded command message from the MSC to the communicator over the control channel as control signals, bypassing the voice channel; and d) decoding the encoded command message at the communicator to retrieve the command message.

21. The method of claim 15, wherein the step of transmitting a subject status data message from a radio collar coupled to the subject includes transmitting data identifying the subject.

22. The method of claim 15, wherein the step of transmitting a subject status data message from a radio collar coupled to the subject includes transmitting data identifying a present location of the subject.

23. The method of claim 15, wherein the step of transmitting a subject status data message from a radio collar coupled to the subject includes transmitting status information regarding operation of the radio collar.

24. The method of claim 15, wherein the step of transmitting a subject status data message from a radio collar coupled to the subject includes transmitting information regarding a criminal conviction of the subject.

25. The method of claim 15, wherein the step of transmitting a subject status data message from a radio collar coupled to the subject includes transmitting supervisory information regarding authorities responsible for supervising the subject.

26. The method of claim 15, wherein the step of encoding the violation status data message at the communicator to create an encoded violation status data message for transmission over the control channel as control signals includes manipulating a Global System for Mobile communications (GSM) control channel frame to create a manipulated GSM control channel frame that includes at least a portion of the violation status data message for transmission over a GSM control channel.

27. The method of claim 26, wherein the step of transmitting the encoded violation status data message over the control channel as control signals to a MSC, bypassing the voice channel, includes the step of transmitting the manipulated GSM control channel frame that includes at least a portion of the violation status data message over a GSM logical control channel to the MSC, bypassing the voice channel.

28. The method of claim 15, wherein the step of encoding the violation status data message at the communicator to create an encoded violation status data message for transmission over the control channel as control signals includes manipulating an autonomous registration reverse control channel message at the communicator to create a manipulated autonomous registration reverse control channel message that includes at least a portion of the violation status data message for transmission over the control channel.

29. The method of claim 28, wherein the step of transmitting the encoded subject status data message over the control channel as control signals to a MSC, bypassing the voice channel, includes the step of transmitting the manipulated autonomous registration reverse control channel message over the reverse control channel, bypassing the voice channel.

30. The method of claim 15, wherein violation status data message created in the step of generating a violation status data message for transmission to the central monitoring station includes at least a portion of the subject status data message last received by the receiver coupled to the communicator.

* * * * *